US 008635312B2

(12) United States Patent
Cho et al.

(10) Patent No.: US 8,635,312 B2
(45) Date of Patent: *Jan. 21, 2014

(54) METHOD AND APPARATUS FOR UPDATING SYSTEM INFORMATION IN BROADBAND WIRELESS COMMUNICATION SYSTEM

(75) Inventors: Hee-Jeong Cho, Gyeonggi-do (KR); Ki-Seon Ryu, Gyeonggi-do (KR); Doo-Hyun Sung, Gyeonggi-do (KR); Ae-Ran Youn, Gyeonggi-do (KR); Yong-Ho Kim, Gyeonggi-do (KR); Young-Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,171

(22) Filed: Aug. 1, 2012

(65) Prior Publication Data

US 2013/0028206 A1    Jan. 31, 2013

Related U.S. Application Data

(63) Continuation of application No. 12/703,559, filed on Feb. 10, 2010, now Pat. No. 8,271,627.

(60) Provisional application No. 61/151,199, filed on Feb. 10, 2009, provisional application No. 61/151,850, filed on Feb. 12, 2009, provisional application No. 61/157,561, filed on Mar. 5, 2009, provisional application No. 61/185,591, filed on Jun. 10, 2009, provisional application No. 61/219,770, filed on Jun. 24, 2009.

(30) Foreign Application Priority Data

Jan. 8, 2010   (KR) .................. 10-2010-0001968
Feb. 9, 2010   (KR) .................. 10-2010-0011899

(51) Int. Cl.
*G06F 15/177* (2006.01)
*H04J 3/24* (2006.01)
*H04J 3/00* (2006.01)

(52) U.S. Cl.
USPC ............................ 709/221; 370/474; 370/476

(58) Field of Classification Search
USPC .......... 709/201–226; 370/328–350, 252, 474, 370/476; 455/70–95, 404, 436
See application file for complete search history.

(56) References Cited

U.S. PATENT DOCUMENTS

| | | | |
|---|---|---|---|
| 6,609,097 B2 * | 8/2003 | Costello et al. ................ | 704/500 |
| 7,680,148 B2 | 3/2010 | Nishibayashi et al. | |
| 8,169,940 B2 * | 5/2012 | Park et al. ..................... | 370/311 |
| 8,325,627 B2 * | 12/2012 | Pratt et al. ..................... | 370/255 |
| 2001/0033560 A1 * | 10/2001 | Tong et al. .................... | 370/337 |
| 2006/0104302 A1 | 5/2006 | Cho et al. | |
| 2007/0286107 A1 | 12/2007 | Singh et al. | |
| 2008/0117853 A1 | 5/2008 | Kim et al. | |
| 2009/0103569 A1 * | 4/2009 | Cho et al. ..................... | 370/498 |
| 2010/0002641 A1 * | 1/2010 | Li et al. ........................ | 370/329 |
| 2011/0032899 A1 * | 2/2011 | Park et al. ..................... | 370/329 |
| 2011/0103253 A1 * | 5/2011 | Qi et al. ........................ | 370/252 |

FOREIGN PATENT DOCUMENTS

| | | |
|---|---|---|
| CN | 1968446 | 5/2007 |
| JP | 2006-148920 | 6/2006 |
| RU | 2370894 | 10/2009 |
| WO | 2008/013390 | 1/2008 |
| WO | 2008/038209 | 4/2008 |
| WO | 2008/051034 | 5/2008 |
| WO | 2008/111706 | 9/2008 |
| WO | 2008/124991 | 10/2008 |

OTHER PUBLICATIONS

Nokia, et al., "IEEE 802.16m System Description Document [Draft]," IEEE 802.16 Broadband Wireless Access Working Group, IEEE 802.16m-08/003r7, Feb. 2009, 171 pages.

* cited by examiner

*Primary Examiner* — Joseph Avellino
*Assistant Examiner* — Mark O Afolabi

(74) *Attorney, Agent, or Firm* — Lee, Hong, Degerman, Kang & Waimey

(57) ABSTRACT

A method for updating system information in a broadband wireless communication system includes: receiving information by means of superframes including a primary superframe header (P-SFH) and a secondary superframe header (S-SFH), wherein the information including control information transmitted via an information element of the P-SFH (P-SFH IE) and system information transmitted via an information element of a subpacket (SP) of the S-SFH (S-SFH SP IE); decoding the P-SFH IE, wherein the P-SFH IE including a scheduling information bitmap indicating transmitted S-SFH SP IEs in the superframe, a change count (CC) of the S-SFH, and a SP change bitmap indicating changing status of the S-SFH SP IEs; comparing the received CC with a previously stored CC; checking the S-SFH SP change bitmap, when a difference exists between the received CC and the stored CC; and decoding and updating corresponding SP IE of the S-SFH based on the checking result.

13 Claims, 20 Drawing Sheets

METHOD AND APPARATUS FOR UPDATING SYSTEM INFORMATION IN BROADBAND WIRELESS COMMUNICATION SYSTEM

CROSS-REFERENCE TO RELATED APPLICATIONS

This application is a continuation of U.S. patent application Ser. No. 12/703,559, filed on Feb. 10, 2010, now U.S. Pat. No. 8,271,627, which claims the benefit of earlier filing date and right of priority to Korean Patent Application Number 10-2010-0001968 filed on Jan. 8, 2010, and Korean Patent Application Number 10-2010-0011899 filed on Feb. 9, 2010, and also claims the benefit of U.S. Provisional Application No. 61/151,199, filed on Feb. 10, 2009, U.S. Provisional Application No. 61/151,850, filed on Feb. 12, 2009, U.S. Provisional Application No. 61/157,561, filed on Mar. 5, 2009, U.S. Provisional Application No. 61/185,591, filed on Jun. 10, 2009, and U.S. Provisional Application No. 61/219,770, filed on Jun. 24, 2009 the contents of which are all hereby incorporated by reference herein in their entirety.

TECHNICAL FIELD

The present invention relates to updating of system information in a broadband wireless communication system and, more particularly, to a method and apparatus for updating system information transferred via a superframe header.

BACKGROUND ART

For communication between a base station and a terminal in a broadband wireless communication system, system information requisite for communication must be transmitted from the base station to the terminal. The base station may transfer essential system information requisite for its communication with the terminal via a superframe header (SFH) and transfer additional system information via a broadcast message.

Among the system information, the essential system information transferred via the SFH must be periodically updated for continuous communication between the base station and the terminal, and the terminal must periodically check whether or not the essential system information transferred from the base station has been changed, and perform decoding and updating on the system information.

However, with the system information not changed, if the terminal always decodes and updates the system information transferred via the SFH or the like, power of the terminal is unnecessarily consumed. In particular, if the terminal in a sleep mode or in an idle mode decodes and updates the system information transferred via the SFH, it would be ineffective in terms of power consumption of the terminal.

Thus, a more effective system information updating method is required to prevent power consumption of the terminal.

DISCLOSURE OF THE INVENTION

Therefore, an object of the present invention is to provide a method and apparatus for effectively updating system information by not allowing a terminal to decode unnecessary system information and preventing power consumption.

To achieve these and other advantages and in accordance with the purpose of the present invention, as embodied and broadly described herein, there is provided a method for updating system information in a broadband wireless communication system in which data is transmitted and received via a superframe, including: receiving information from a base station by means of superframes including a primary superframe header (P-SFH) and a secondary superframe header (S-SFH), wherein the information including control information transmitted via an information element of the P-SFH (P-SFH IE) and system information transmitted via at least one of information element of a subpacket (SP) of the S-SFH (S-SFH SP IE); decoding the P-SFH IE, wherein the P-SFH IE including a scheduling information bitmap indicating a transmitted S-SFH SP IEs in the superframe, a change count (CC) of the S-SFH, and a SP change bitmap indicating changing status of the S-SFH SP IEs; comparing the received CC with a previously stored CC; checking the S-SFH SP change bitmap, if there is a difference between the received CC and the stored CC; and decoding and updating corresponding SP IE of the S-SFH based on the checking result.

In one exemplary embodiment, the method may further include a step of storing the received CC and the SP change bitmap of the S-SFH.

In another embodiment, the step of checking the SP change bitmap is checking a number of toggled bits of a previously stored SP change bitmap by comparing the SP change bitmap with the stored SP change bitmap, and wherein the corresponding SP IE for decoding and updating is the SP IE whose bit of the SP change bitmap is toggled, if the number of toggled bits is the same as the difference between the received CC and the stored CC.

In another embodiment, the step of checking the SP change bitmap is checking a number of bits whose value is set to 1, and wherein the corresponding SP IE for decoding and updating is the SP IE whose bit of the SP change bitmap is set to 1, if the number of bits whose value is set to 1 is the same as the difference between the received CC and the stored CC.

In another embodiment, the step of checking the SP change bitmap is checking a number of toggled bits of a previously stored SP change bitmap by comparing the SP change bitmap with the stored SP change bitmap, and wherein the corresponding SP IE for decoding and updating is all of the received SP IEs, if the number of toggled bits is different with a value of difference between the received CC and the stored CC.

In another embodiment, the S-SFH comprises three SP IEs and the SP change bitmap comprises three bits indicating a changing status of the three SP IEs respectively, and when any value of the SP IEs is changed, a bit at a corresponding position in the SP change bitmap is toggled or set to 1.

In another embodiment, the S-SFH comprises three SP IEs each having a different transmission period and transmitted according to scheduling of the base station, and scheduling periodicity information of the three SP IEs is transferred via a particular SP IE.

In another embodiment, the S-SFH comprises three SP IEs each having a different transmission period and transmitted according to scheduling of the base station, and scheduling periodicity information of the three SP IEs is transferred via a MAC (Medium Access Control) management message.

In another embodiment, the CC of the S-SFH is incremented by 1 modulo 16 whenever any value of the SP IEs is changed.

To achieve the above object, there is also provided an apparatus for updating system information in a broadband wireless communication system in which data is transmitted and received via a superframe, including: a receiver configured to receive information from a base station by means of a superframe including a primary superframe header (P-SFH) and a secondary superframe header (S-SFH), wherein the information including control information transmitted via an information element of the P-SFH (P-SFH IE) and system information transmitted via at least one of information element of a subpacket (SP) of the S-SFH (S-SFH SP IE); a decoder configured to decode a P-SFH IE including a scheduling information indicating a transmitted S-SFH SP IEs in the superframe and a changing information indicating a changing status of the system information in the S-SFH SP IE; a memory configured to store the changing information; and a controller configured to check whether the system information is changed or not based on the changing information, decode and update the system information.

In one exemplary embodiment, the changing information includes a change count which is incremented by 1 modulo 16 whenever any value of the S-SFH SP IEs is changed and a change bitmap indicating a changing status of the S-SFH SP IEs respectively.

The S-SFH SP IEs may include three SP IEs and the change bitmap including three bits indicating the change status of the three SP IEs respectively and when any value of the S-SFH SP IEs is changed, a bit at a corresponding position in the change bitmap is toggled or set to 1.

In another embodiment, the checking operation of the controller is to check a number of toggled bits by comparing the received change bitmap with a stored change bitmap in the memory, or to check a number of bits whose value is set to 1, and wherein the controller decode and update the corresponding S-SFH SP IE whose bit of the change bitmap is toggled or set to 1, if the number of toggled bits or the number of bits whose value is set to 1 is the same as the difference between the received change count and a previously stored change count in the memory.

To achieve the above object, there is also provided a method for updating system information in a broadband wireless communication system in which data is transmitted and received via a superframe including a first superframe header (P-SFH) and a second superframe header (S-SFH), including: coding a P-SFH information element (IE) including a scheduling information bitmap, a change count, and a subpacket (SP) change bitmap of the S-SFH in the received superframe; transmitting the superframe including the coded P-SFH information element by superframe (in the unit of each superframe); and when an S-SFH subpacket information element is changed, changing the change count of the S-SFH such that it is increased by 1 whenever the S-SFH subpacket is changed, changing the S-SFH subpacket change bitmap such that a bit at a particular position corresponding to a changed particular subpacket is toggled, and transmitting the P-SFH information element including the changed change count of the S-SFH and the subpacket change bitmap and the changed S-SFH subpacket.

To achieve the above object, there is also provided an apparatus for updating system information in a broadband wireless communication system in which data is transmitted and received via a, including: an encoder configured to encode information including control information and system information, wherein the control information including a scheduling information indicating a transmitted system information and a changing information indicating a changing status of the system information; a controller configured to change the changing information whenever any value of the system information is changed; and a transmitter configured to transmit the information by mean of a superframe including a primary superframe header (P-SFH) and a secondary superframe header (S-SFH), wherein the control information transmitted via the P-SFH and the system information transmitted via at least one of subpacket (SP) of the S-SFH.

In one exemplary embodiment, the SP of the S-SFH may include three SPs, and wherein the changing information including a change count which is incremented by 1 modulo 16 whenever any value of the SPs of the S-SFH is changed and a change bitmap indicating a changing status of the SPs respectively, and when any value of the SPs is changed, a bit at a corresponding position in the change bitmap is toggled or set to 1.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Figure 1:
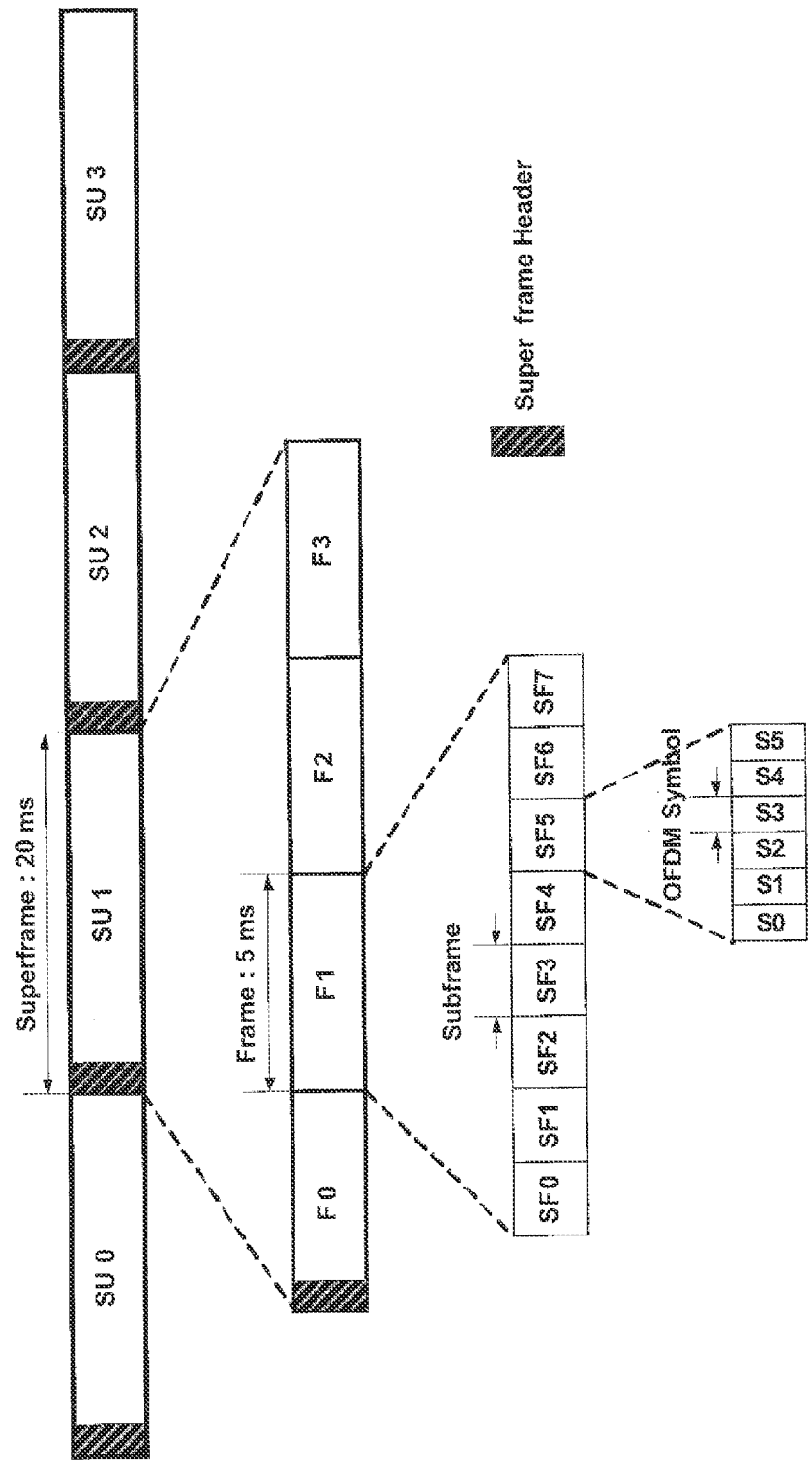
FIG. 1 illustrates the structure of an upper level frame.

Exemplary embodiments of the present invention will now be described in detail with reference to the accompanying drawings. The same reference numerals will be used throughout to designate the same or like components and a repeated description will be omitted. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components. The accompanying drawings, which are given by illustration only, and thus are not limitative of the present invention.

A communication system according to an exemplary embodiment of the present invention is a system for providing various communication services such as voice data, packet data, and the like, which includes a base station and a terminal.

The terminal according to an exemplary embodiment of the present invention may also be referred to as subscriber station (SS), user equipment (UE), mobile equipment (ME), mobile station (MS), and the like, and may include a portable device having a communication function such as a mobile phone, a PDA, a smart phone, a notebook, and the like or a non-portable device such as a PC or a vehicle-mounted device.

The base station (BS) refers to a fixed position communicating with the terminal and may also be referred to as eNB (evolved-NodeB), base transceiver system (BTS), access point (AP), and the like. One or more cells may exist in one base station, and an interface for transmitting user traffic or control traffic may be used between base stations. Downlink refers to a communication channel from the BS to the terminal, and uplink refers to a communication channel from the terminal to the BS.

A multiple access scheme applied to the wireless communication system according to an exemplary embodiment of the present invention includes any multi-access scheme such as a code division multiple access (CDMA), a time division multiple access (TDMA), a frequency division multiple access (FDMA), a single carrier-frequency division multiple access (SC-FDMA), an orthogonal frequency division multiple access (OFDMA), and the like.

Multiple access methods for downlink and uplink transmission may differ, and for example, downlink may employ an OFDMA scheme while uplink may employ an SC-FDMA scheme.

Embodiments of the present invention will be described below in detail with reference to the accompanying drawings, where those components are rendered the same reference number that are the same or are in correspondence, regardless of the figure number, and redundant explanations are omitted.

FIG. 1 shows a basic frame structure.

As shown in FIG. 1, the frame structure applied to the system of the present invention may include a frame of 5 ms as a basic element, and the frame, a basic single transmission unit, may be defined as an interval between preambles. The frame includes at least one subframe, and may include a plurality of transmission time intervals (TTI) each having a different size. The TTI is a basic unit of scheduling performed at a medium access control (MAC) layer. The TTI may be a radio resource allocation unit.

A superframe is configured with a plurality of frames. The superframe may be configured in the unit of, for example, 20 ms. When a superframe is configured, system configuration information and broadcast information for an initial fast cell selection and low latency service are set as a transmission unit, and in general, two to six frames form a single superframe. In addition, each frame in the unit of 5 ms includes a plurality of subframes, and each subframe includes a plurality of OFDM/OFDMA symbols. Each superframe includes a single superframe header (SFH) including a broadcast channel, and the SFH is positioned at a first subframe of the corresponding superframe. A substantial frame structure may be designed depending on the bandwidth of a system channel, a duplexing method, a cyclic prefix (CP) length, and the like.

Figure 2:
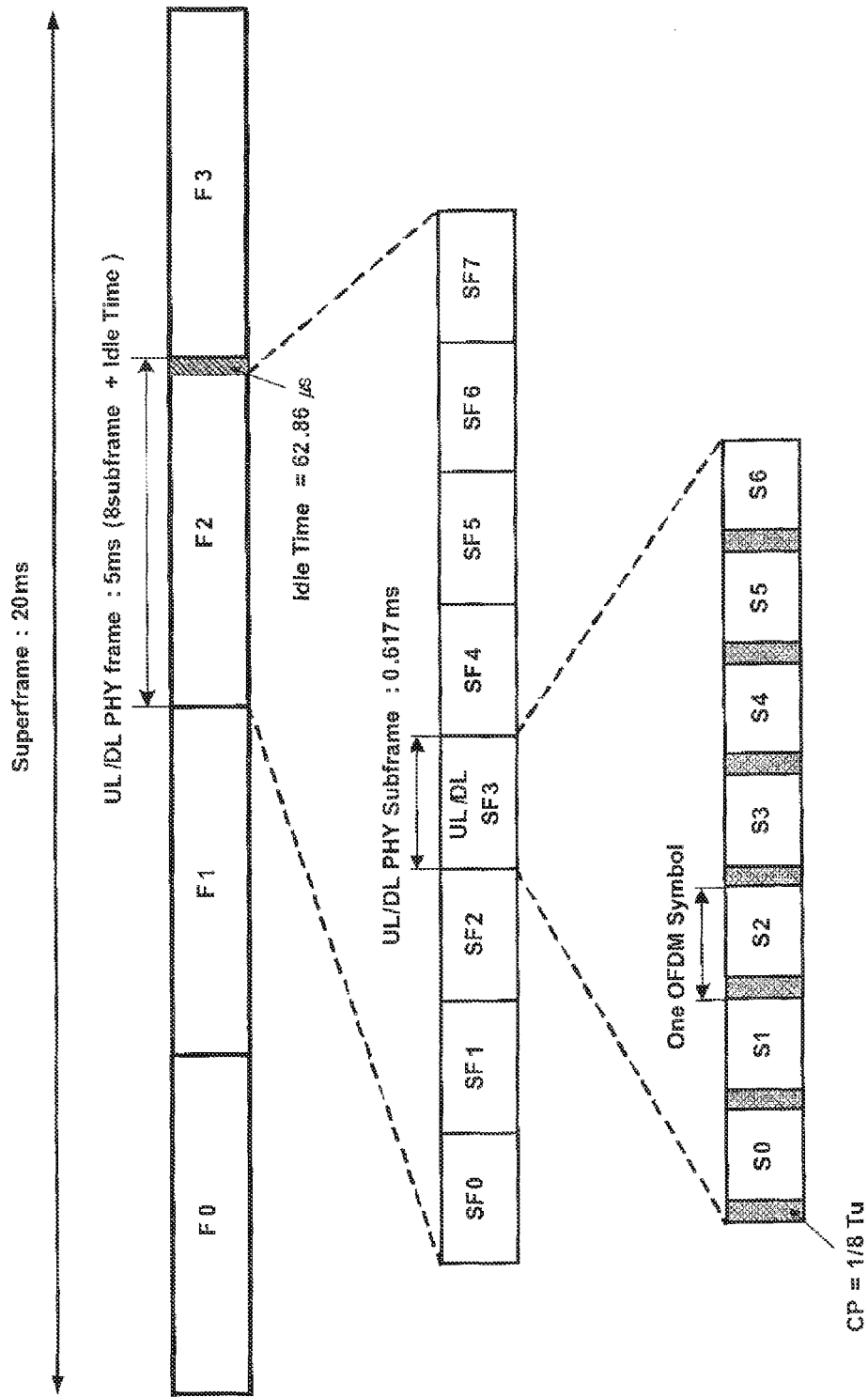
FIG. 2 illustrates the structure of a frequency division duplex (FDD) type frame.

FIG. 2 shows a frame structure for a frequency division duplex (FDD) mode.

In the FDD mode, downlink and uplink transmissions are discriminated on a frequency domain, and every subframe of each frame is available for downlink and uplink transmission. A terminal in the FDD mode may access an uplink subframe and, at the same time, receive a data burst via any of downlink subframe.

As shown in FIG. 2, a superframe of 20 ms includes four frames (F0, F1, F2, F3) with a length of 5 ms, and one frame F2 includes eight subframes (SF0, SF1, SF2, SF3, SF4, SF5, SF6, SF7) with a length of 0.617 ms and an idle time interval of 62.86 μs. Each subframe may include seven OFDM symbols (S0, S1, S2, S3, S4, S5, S6).

Figure 3:
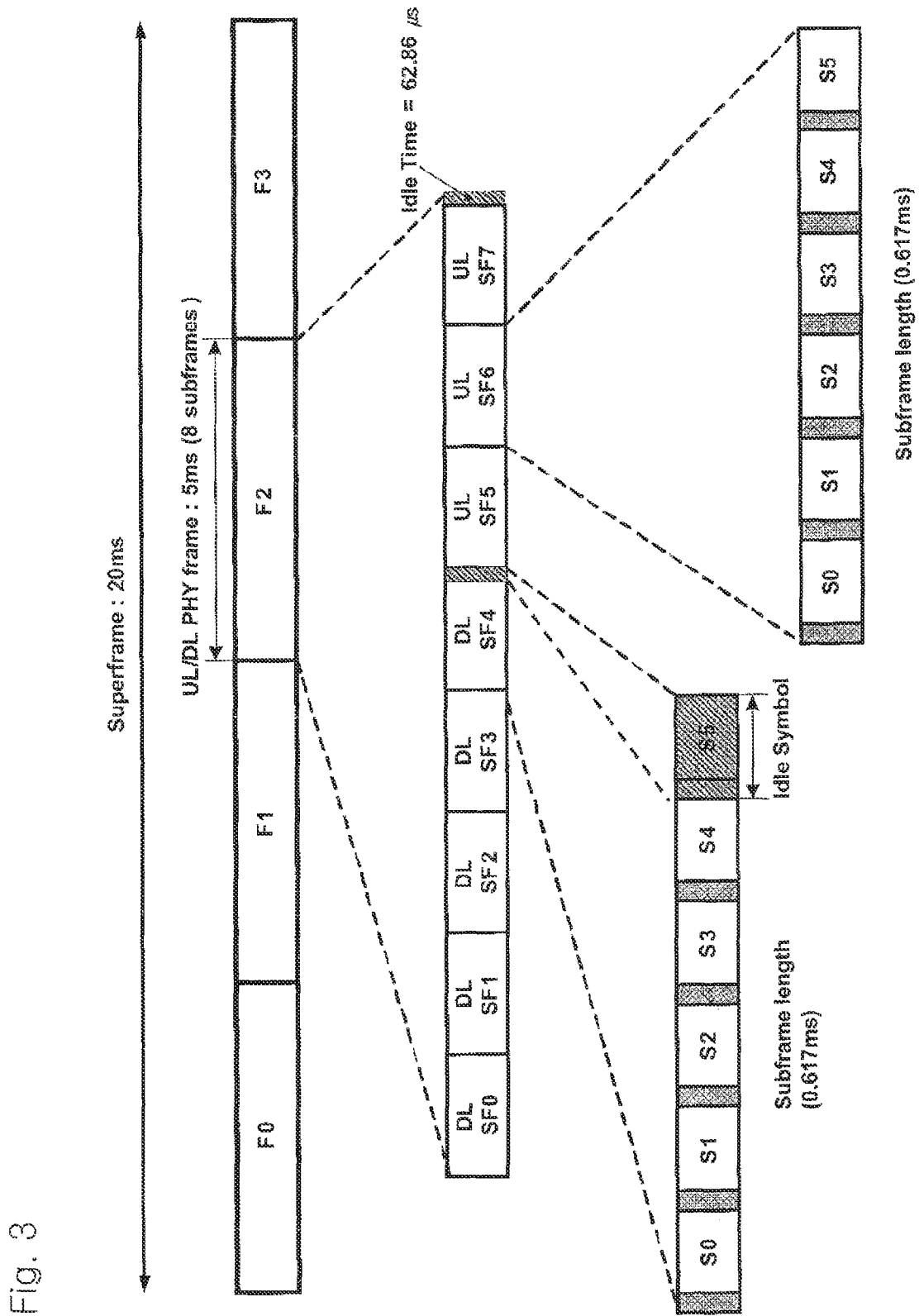
FIG. 3 illustrates the structure of a time division duplex (TDD) type frame.

FIG. 3 shows a frame structure for a time division duplex (TDD) mode.

In a TDD mode, downlink and uplink transmissions are discriminated on a time domain, and an uplink transmission time interval is allocated following a downlink transmission time interval, so that data is transmitted and received via downlink and uplink.

As shown in FIG. 3, one superframe of 20 ms includes four frames (F0, F1, F2, F3) of 5 ms, and one frame F2 includes eight subframes (SF0, SF1, SF2, SF3, SF4, SF5, SF6, SF7) with a length of 0.617 ms and an idle time interval of 62.86 μs. The frame F2 includes D number of downlink frames and U number of uplink frames determined according to a ratio (D:U) of downlink (DL) and uplink (UL). When the ratio of DL and UL is 5:3, five subframes (SF0, SF1, SF2, SF3, SF4) are configured as downlink frames and three subframes (SF5, SF6, SF7) are configured as uplink frames. One idle symbol for discriminating DL and UL is inserted between the final downlink subframe SF4 and the first uplink subframe SF5 to indicate switching from the DL to UL. The gap inserted between the downlink and the uplink is called a transmit transition gap (TTG), and a gap inserted between uplink and downlink is called a receive transition gap (RTG), by which a transmission end and a reception end can discriminate a downlink transmission and an uplink transmission.

Also, the final downlink subframe SF4 includes five OFDM symbols and a final one idle symbol S5. The idle symbol S5 serves as a TTG discriminating downlink (DL) and uplink (UL).

A superframe header (SFH) will now be described in detail.

In a broadband wireless access system, an SFH transfers system information essential for communication between terminals and a base station to the terminals. As shown in FIG. 1, the SFH is positioned at the first subframe within a single superframe. The SFH may include a primary SFH (P-SFH) delivering control information for receiving the SFH and a secondary-SFH (S-SFH) delivering essential system information such as network entry.

The S-SFH may include a plurality of subpackets (SP) according to a transmission frequency of system information, and preferably, the S-SFH includes three SPs (SP1, SP2, and SP3).

The P-SFH is transmitted during every superframe, and an information element (IE) of the P-SFH includes information related to 4-bit-LSB information of a superframe number (SFN) and the S-SFH. The information element of the P-SFH mean a set of information related to the superframe number and the S-SFH. The information related to the S-SFH includes an S-SFH change count indicating the version of a currently transmitted S-SFH, an S-SFH scheduling information bitmap indicating what kind of S-SFH SP(s) are transmitted in a corresponding superframe, an S-SFH size indicating the number of LRUs allocated for an S-SFH transmission, an S-SFH number of repetitions indicating a transmission format of an S-SFH, an S-SFH SP change bitmap indicating what kind of S-SFH SP has been changed, and the like. The size of the S-SFH scheduling information bitmap and the S-SFH SP change bitmap fields is equal to the total number of SPs of the S-SFH.

The S-SFH delivers actual system information (which is called an information element of the S-SFH), and as described above, the delivered system information may be included in three subpackets according to their characteristics, each of which is called an S-SPH SPn (n=1, 2, 3). Each S-SFH SP information element (IE) has a different transmission period. When a transmission period of the SP1 is $T_{SP1}$, that of the SP 2 is $T_{SP2}$, and that of the SP3 is $T_{SP3}$, the transmission periods of the subpackets may be represented by, for example, $T_{SP1} < T_{SP2} < T_{SP3}$.

For continued communication with the base station, the terminals must update system information transferred via the S-SFH SPs. In this case, however, if decoding and updating an S-SFH IE although system information has not been changed will be effective in terms of power consumption of the terminals. Thus, the present invention proposes a method for effectively updating system information transferred via an S-SFH.

The terminal must detect an information error in a P-SFH received from the base station before updating system information delivered from the base station.

Figure 4:
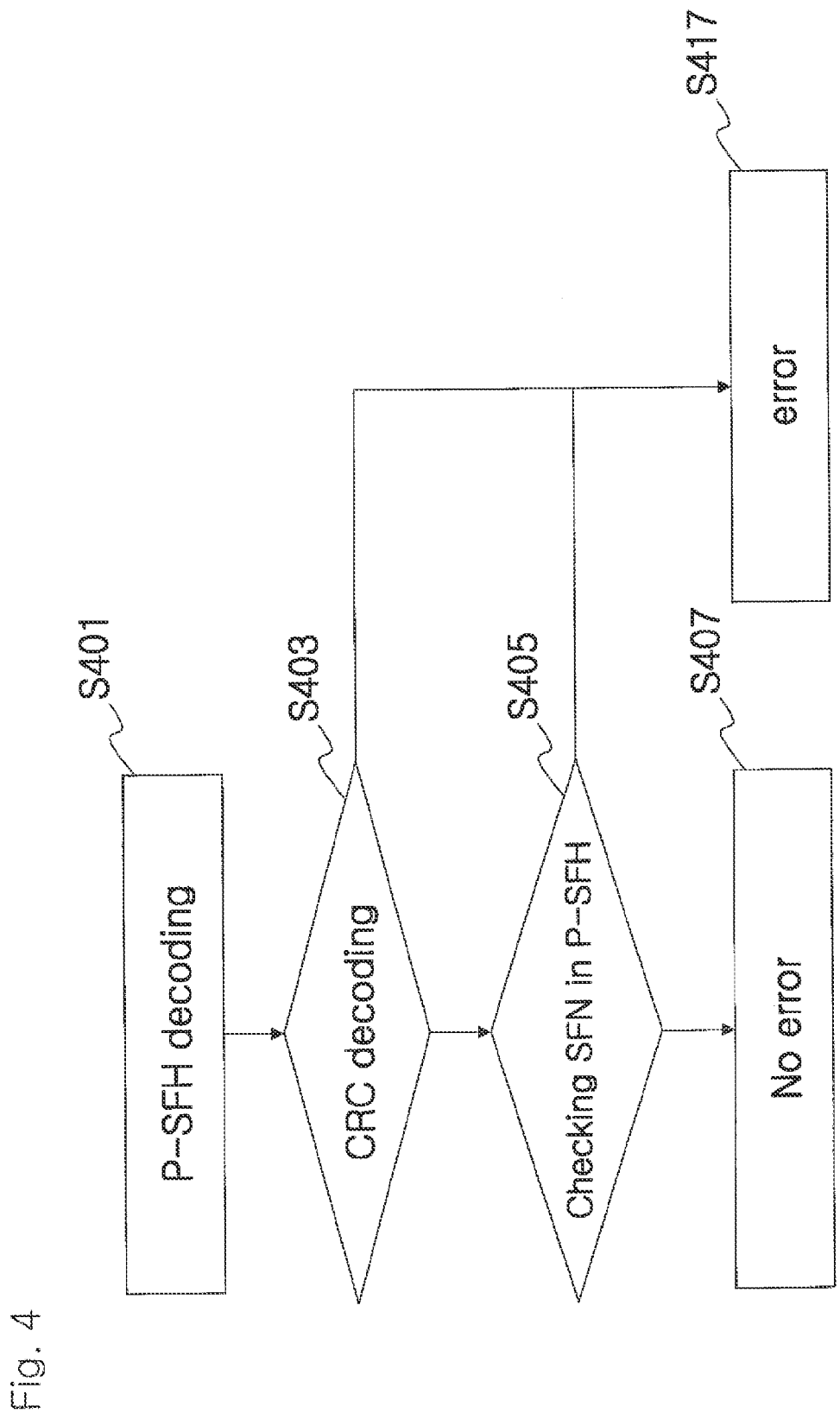
FIG. 4 is a flow chart illustrating the process of detecting an information error in a P-SFH received by a terminal from a base station according to an exemplary embodiment of the present invention.

FIG. 4 shows a flow chart illustrating the process of detecting an information error in a P-SFH received by a terminal from a base station according to an exemplary embodiment of the present invention.

The P-SFH may include a 4-bit-LSB superframe number (SFN), an S-SFH change count (referred to as a 'CC', hereinafter), an S-SFH scheduling information bitmap, an S-SFH size, an S-SFH number of repetitions, an S-SFH SP change bitmap (referred to as a 'CB', hereinafter), as well as a cyclic redundancy check (CRC). In general, in order to check whether there is an error in the P-SFH transmitted via air interface, the terminal calculates a CRC value based on the received data. The terminal determines whether or not there is an error in information within the P-SFH according to the calculated CRC value.

Comparatively, however, the present invention proposes a process of additionally determining whether or not an error has occurred by using the 4-bit-LSB superframe number field within the P-SFH even when it is determined that there is no error in the general P-SFH error detection procedure through the CRC.

First, the terminal decodes the received P-SFH (S401).

The terminal primarily determines whether or not there is an error in the information within the P-SFH by decoding a CRC value included in the P (S403).

If the terminal determines that there is an error at the corresponding superframe according to the error generation determination result through the CRC checking, the superframe is processed as an error (S417), and if the terminal determines that there is no error at the corresponding superframe, the terminal successfully receives essential system information through an initial network registration (entry) process (DL synchronization), and calculates a superframe number (SFN).

The terminal determines whether or not the corresponding P-SFH has been properly transmitted without an error by checking the superframe number (SFN) within the P-SFH transmitted from the base station by comparing the calculated SFN (S405).

If the terminal determines that there is an error at the information within the P-SFH, it may process the corresponding superframe as having an error and does not take any further operation (S417).

If the SFN within the P-SFH transmitted from the base station and the SFN calculated by the terminal are determined to be the same, the terminal determines that the corresponding superframe does not have an error (S407).

When the S-SFH is transmitted during the corresponding superframe, the terminal is able to calculate a CRC with respect to the S-SFH, and if the terminal determines that there is no error in the information within the S-SFH, it may take a normal action on the corresponding superframe.

The procedure of updating essential system information by the terminal using the S-SFH change count and the S-SFH SP change bitmap delivered via the P-SFH will now be described.

Figure 5:
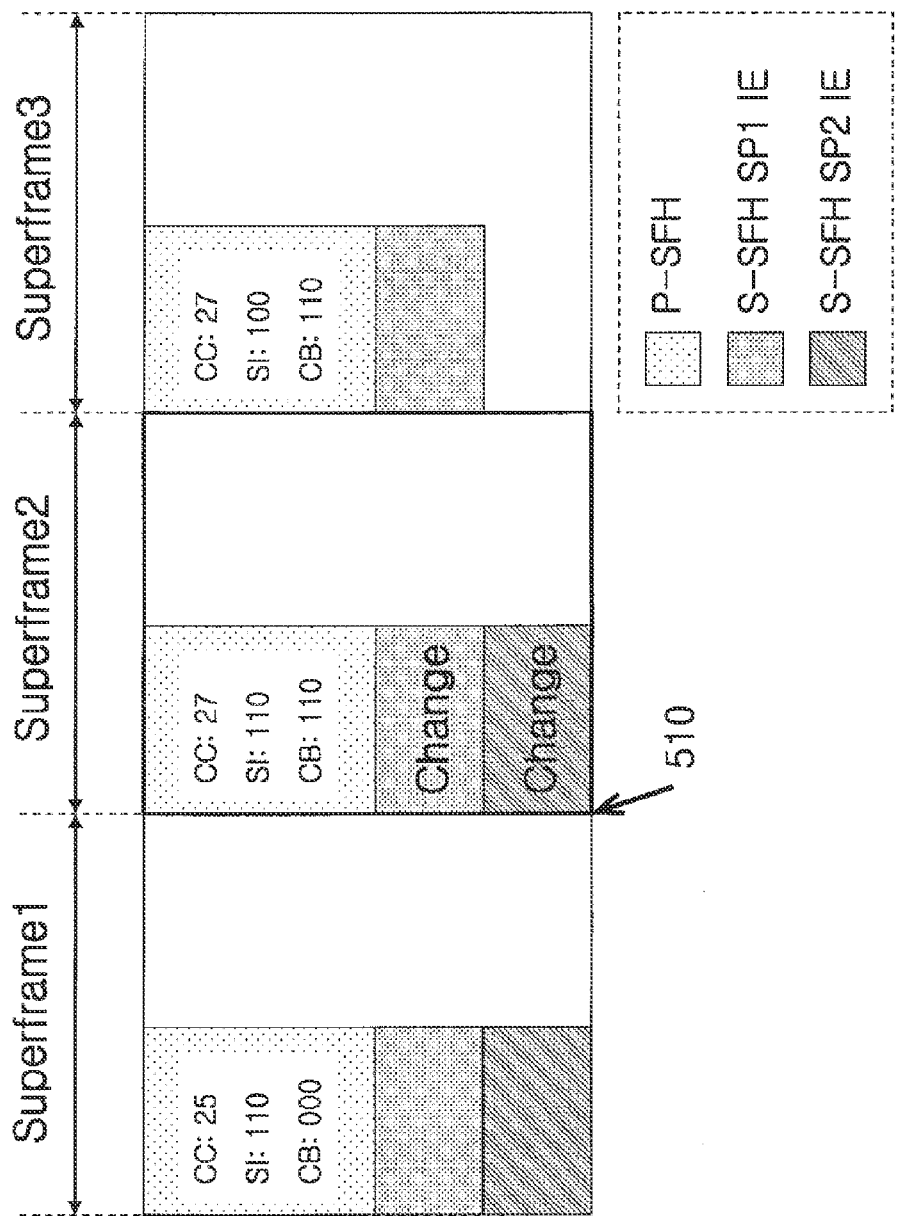
FIG. 5 illustrates a method of changing a change count of an S-SFH and S-SFH subpacket (SP) change bitmap (CB) information transferred via a P-SCH when system information is changed according to an exemplary embodiment of the present invention.

FIG. 5 illustrates a method of changing a change count of an S-SFH and S-SFH subpacket (SP) change bitmap (CB) information transferred via a P-SCH when system information is changed according to an exemplary embodiment of the present invention.

As illustrated in FIG. 5, the CC of the S-SFH and the CB of the S-SFH SP delivered via the P-SFH can be changed as any of the values of the S-SFH subpacket (SP) IEs by the base station.

The CC in FIG. 5 is a change count indicating whether or not the essential system information delivered via the S-SFH has been changed or not, and SI, a scheduling information bitmap, indicates a transmitted S-SFH SP in the corresponding superframe. Also, the CB of the S-SFH indicates a changing status of the S-SFH SP IEs in the corresponding superframe. Each bit of the CB indicates the changing status of the corresponding S-SFH SP IE. The bit #0, bit #1, bit #2 are mapped to S-SFH SP1 IE, S-SFH SP2 IE and S-SFH SP3 IE, respectively. If any of the value of an S-SFH SP IE are changed, the corresponding bit may be toggled or set to 1.

As illustrated, the CC, SI and CB information may be delivered via the P-SFH in the superframe. On the assumption that, the last stored CC value of a terminal is 25 and S-SFH SP1 and SP2 with unchanged system information are scheduled and transmitted by means of the superframe 1, the last received CC of the P-SFH of the superframe 1 is the same as the last stored CC. The SI bitmap transmitted by means of the superframe 1 is set to be '110' to indicate the SPs of the scheduled S-SFH are SP1 and SP2. The CB is '000' to indicate that the SP IEs remain unchanged.

In FIG. 5, as any system information transmitted via the S-SFH SPs is changed, the S-SFH CC increases in a superframe in which the changed S-SFH SP IE is first transmitted. Namely, the CC is increased from 25 to 27 in a superframe 2 at a transmitting point 510 at which the changed SP1 and SP2 are first transmitted. In this case, because the counter is increased by SP and the information elements of two SPs are changed, two count of the CC are increased to 27.

Accordingly, in the P-SFH of the superframe 2, the CC is increased to 27, the SI bitmap is set to be '110' to indicate the SPs of the scheduled S-SFH are SP1 and SP2, and the CB is '110' to indicate the changed SP IEs are SP1 and SP2.

Also, system information has not been changed in a superframe 3 and only SP1 is scheduled, so the CC at the P-SFH of the superframe 3 is maintained as 27, the SI bitmap is set to be '100' in order to indicate the SP of the scheduled S-SFH is SP1, and the CB is maintained to be '110'.

Figure 6:
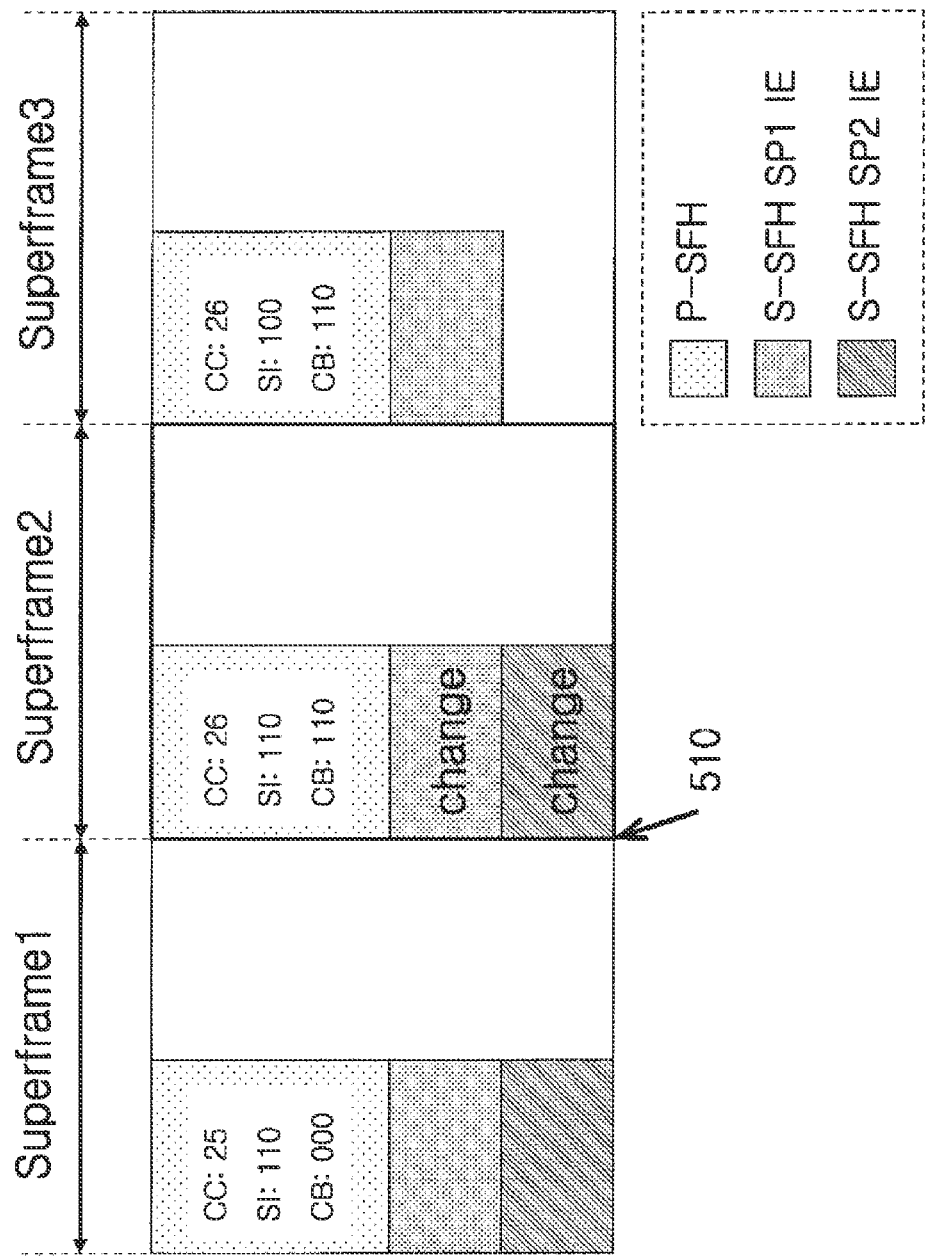
FIG. 6 illustrates a method of changing a change count of an S-SFH and S-SFH subpacket (SP) change bitmap (CB) information transferred via a P-SCH when system information is changed according to a different exemplary embodiment of the present invention.

FIG. 6 illustrates a method of changing the CC of an S-SFH and the CB of the S-SFH subpacket (SP) transferred via the P-SCH when system information is changed according to another embodiment of the present invention;

Compared with the exemplary embodiment illustrated In FIG. 5 in which the CC is increased as the number of changed SP IEs, in the exemplary embodiment illustrated in FIG. 6, CC is increased by the number of a superframe (i.e., in the unit of superframe). Any other information elements (SI and CB) of the P-SFH are the same as that of FIG. 5. Namely, the CC is increased from 25 to 26 during the superframe 2 at the time point 510 at which the changed SP1 and SP2 are first transmitted.

Figure 7:
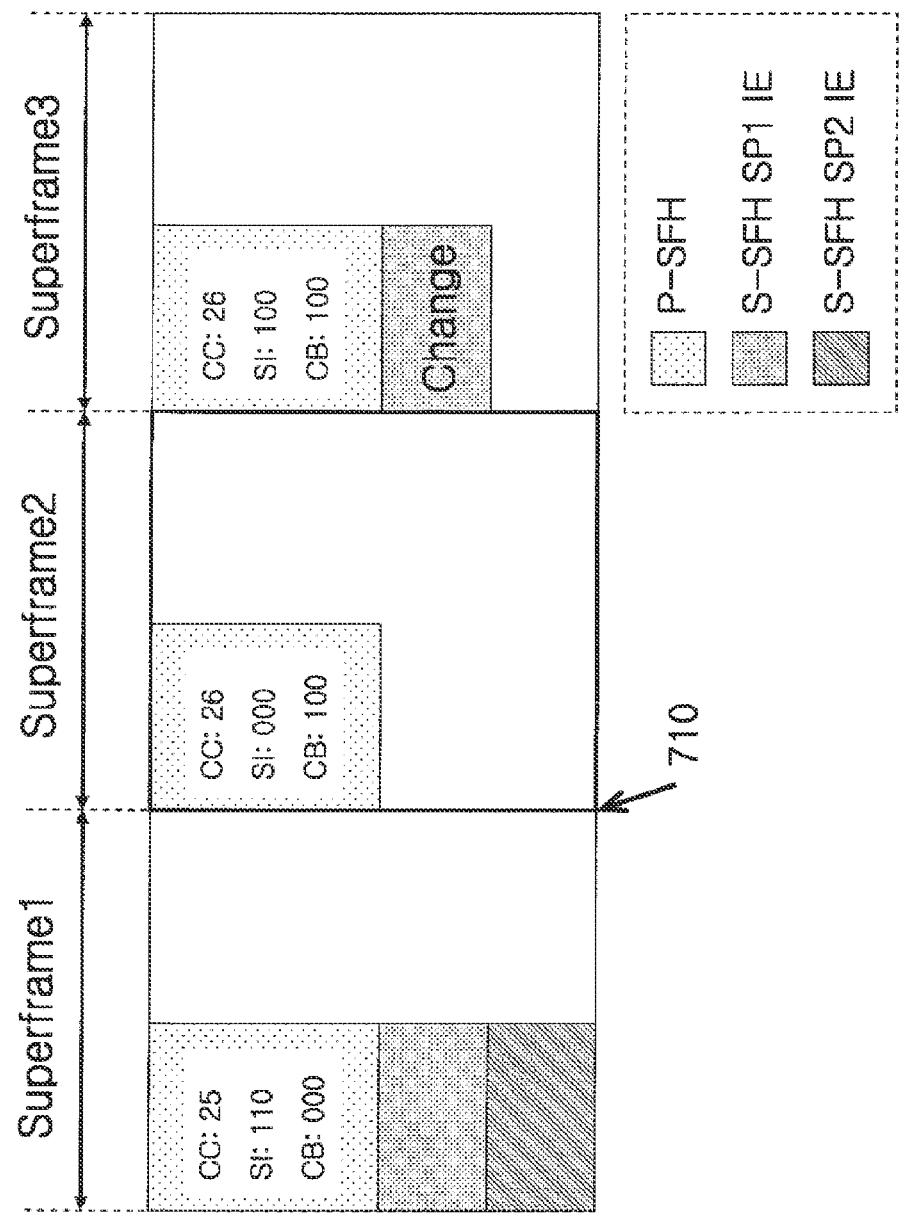
FIG. 7 illustrates a method of changing a change count of an S-SFH and S-SFH subpacket (SP) change bitmap (CB) information transferred via a P-SCH when system information is changed according to a different exemplary embodiment of the present invention.

FIG. 7 illustrates a method of changing the CC of an S-SFH and the CB of the S-SFH subpacket (SP) transferred via a P-SCH when system information is changed according to another embodiment of the present invention.

In the exemplary embodiment illustrated in FIG. 7, unlike the exemplary embodiments illustrated in FIGS. 5 and 6, as the base station recognizes the necessity of changing of S-SFH CC regardless of a transmission time point of the S-SFH SP IE, it increases the S-SFH CC in a superframe 2.

Namely, the base station recognizes the necessity of changing an SP1 at the superframe 2, and transmits the changed SP1 at the third superframe. Thus, the CC is not increased at the superframe 3 at the time point when the changed SP1 is transmitted, and the CC is increased from 25 to 26 at the superframe 2 at the time point 710 at which the necessity of changing the SP1 is recognized.

As illustrated, the CC is increased to 26 at the P-SFH of the superframe 2, and because there is no SP of the scheduled S-SFH at the superframe 2, the SI bitmap is set to be '000' and the CB is set to be '100' in consideration of the change of the SP1.

Also, at the superframe 3, the changed SP1 of the S-SFH is scheduled, the SI bitmap is set to be '100' to indicate that the scheduled SP of the S-SFH is SP1, and CB is maintained to be '100'.

Figure 8:
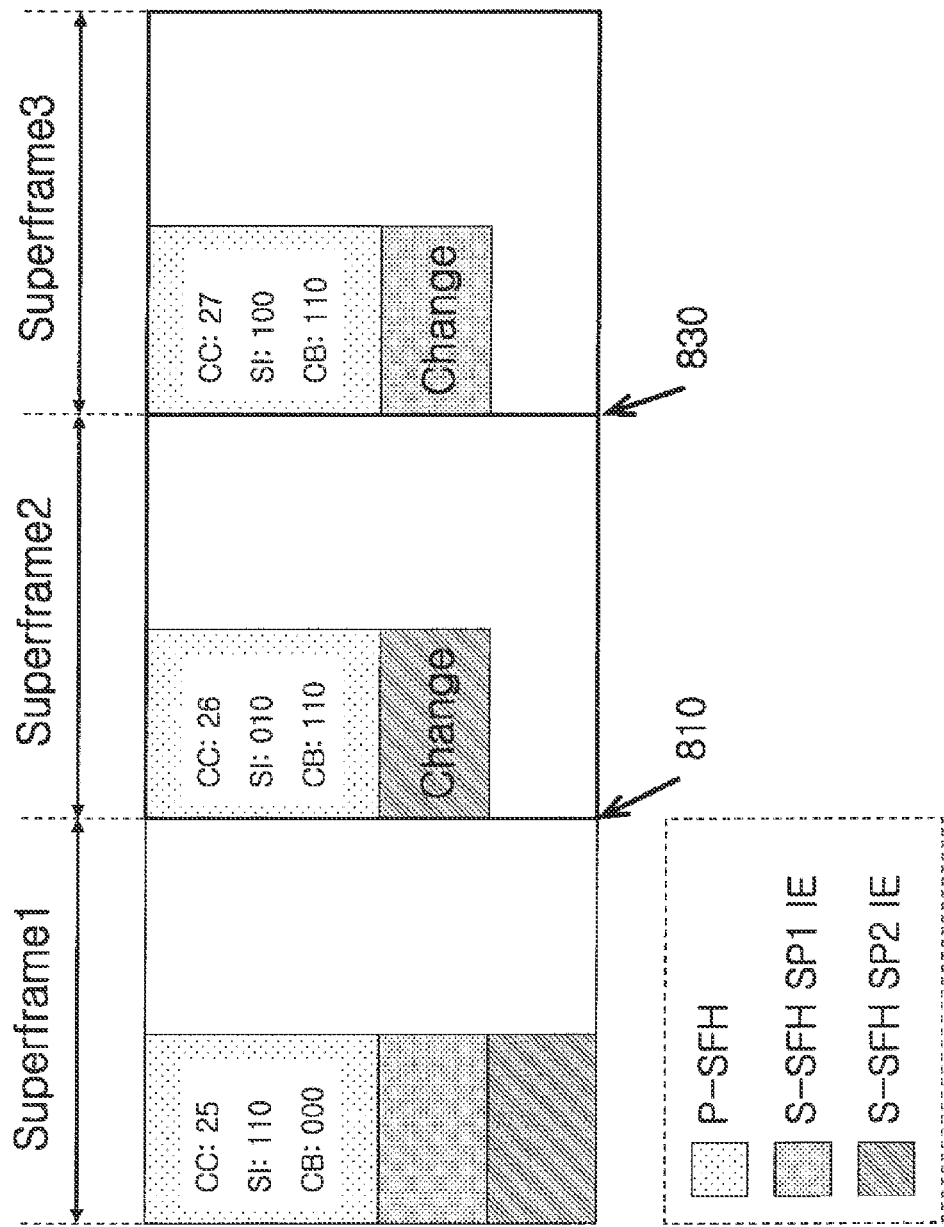
FIG. 8 illustrates a method of changing a change count of an S-SFH and S-SFH subpacket (SP) change bitmap (CB) information transferred via a P-SCH when system information is changed according to a different exemplary embodiment of the present invention.

FIG. 8 illustrates a method of changing a CC of an S-SFH and a CB of an S-SFH subpacket (SP) transferred via a P-SCH when system information is changed according to another embodiment of the present invention.

As illustrated in FIG. 8, when system information transmitted by means of a plurality of S-SFH SP IEs each having a different transmission period, the CC may be increased by 1 whenever any value of the S-SFH SP IE is changed.

Namely, as the information element of S-SFH SP2 is changed at the superframe 2 (810), the CC is increased from 25 to 26, and as the information element of S-SFH SP1 is changed at the superframe 3 (830), the CC is increased from 26 to 27. In this case, if the base station recognizes the necessity of changing the SP1 at the superframe 2, the bitmap of the CB is changed from '000' to '110' at the superframe 2.

Figure 9:
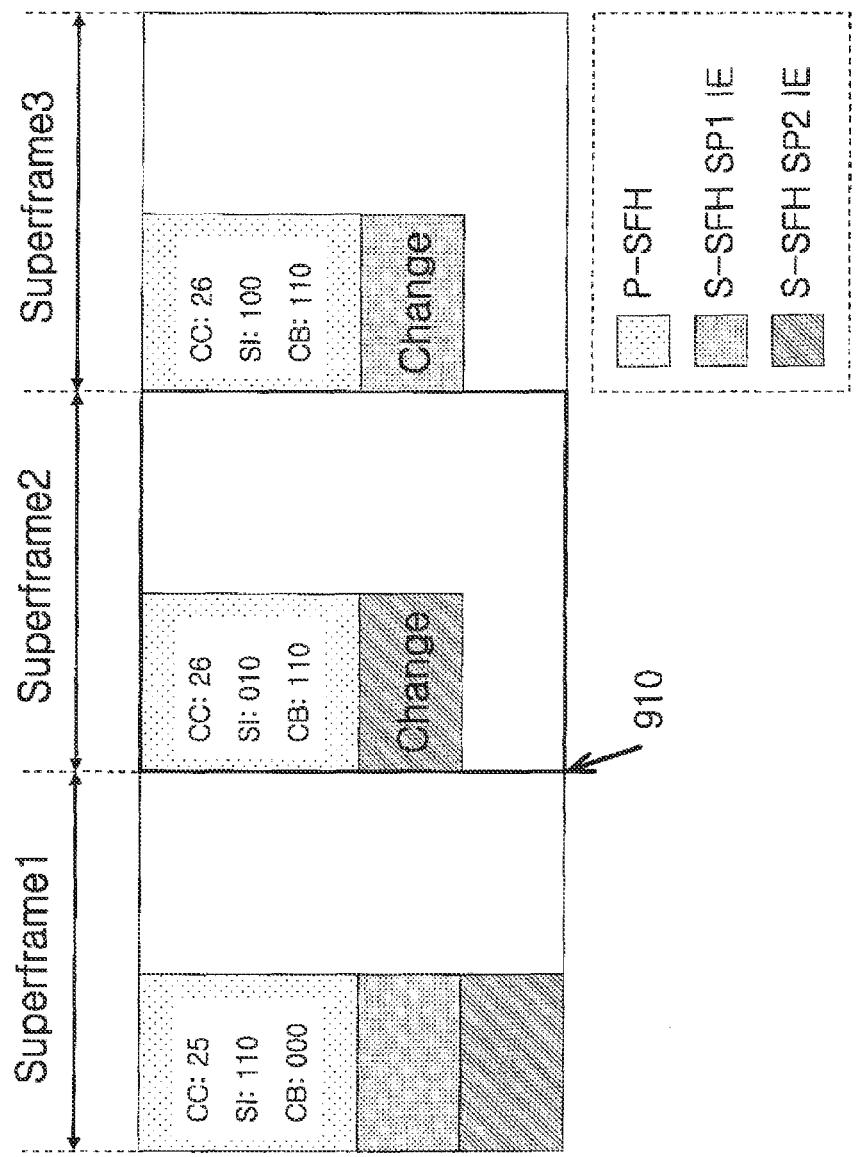
FIG. 9 is illustrates a method of changing a change count of an S-SFH and S-SFH subpacket (SP) change bitmap (CB) information transferred via a P-SCH when system information is changed according to a different exemplary embodiment of the present invention.

FIG. 9 is illustrates a method of changing a CC of an S-SFH and a CB of an S-SFH subpacket (SP) transferred via a P-SCH when system information is changed according to another embodiment of the present invention.

As illustrated in FIG. 9, when the system information transmitted by means of the plurality of S-SFH SP IEs each having a different transmission period is changed, the S-SFH CC (Change Count) at the first transmission superframe (superframe 2 (910)) of the S-SFH SP IE, which is first transmitted among them, is increased. The corresponding superframe with the increased S-SFH change count is considered as a superframe indicating the necessity of changing the other remaining S-SFH SP IEs, so the CB is changed from '000' to '110' at the superframe 2.

As illustrated in FIGS. 8 and 9, the S-SFH change count is increased by 1 whenever the superframe unit is changed or whenever the S-SFH SP IE is changed. Also, if whether or not system information or SFH control information are changed is not required to be informed, the system information or the SFH control information may not affect the increase in the S-SFH change count. Also, although an 8-bit-MSB superframe number transferred via the S-SFH SP1 and a start superframe offset transferred via each S-SFH SP are changed, it may not affect the S-SFH change count.

Equation 1 below shows an increase in the S-SFH CC and, for example, if the size of the S-SFH CC field is 4 bits, N is $16(2^4)$.

$$\text{S-SFH change count} = (\text{S-SFH change count} + 1) \text{ modulo } N \quad \text{[Equation 1]}$$

$$N = 2^{\text{size of S-SFH change count}}$$

Figure 10:
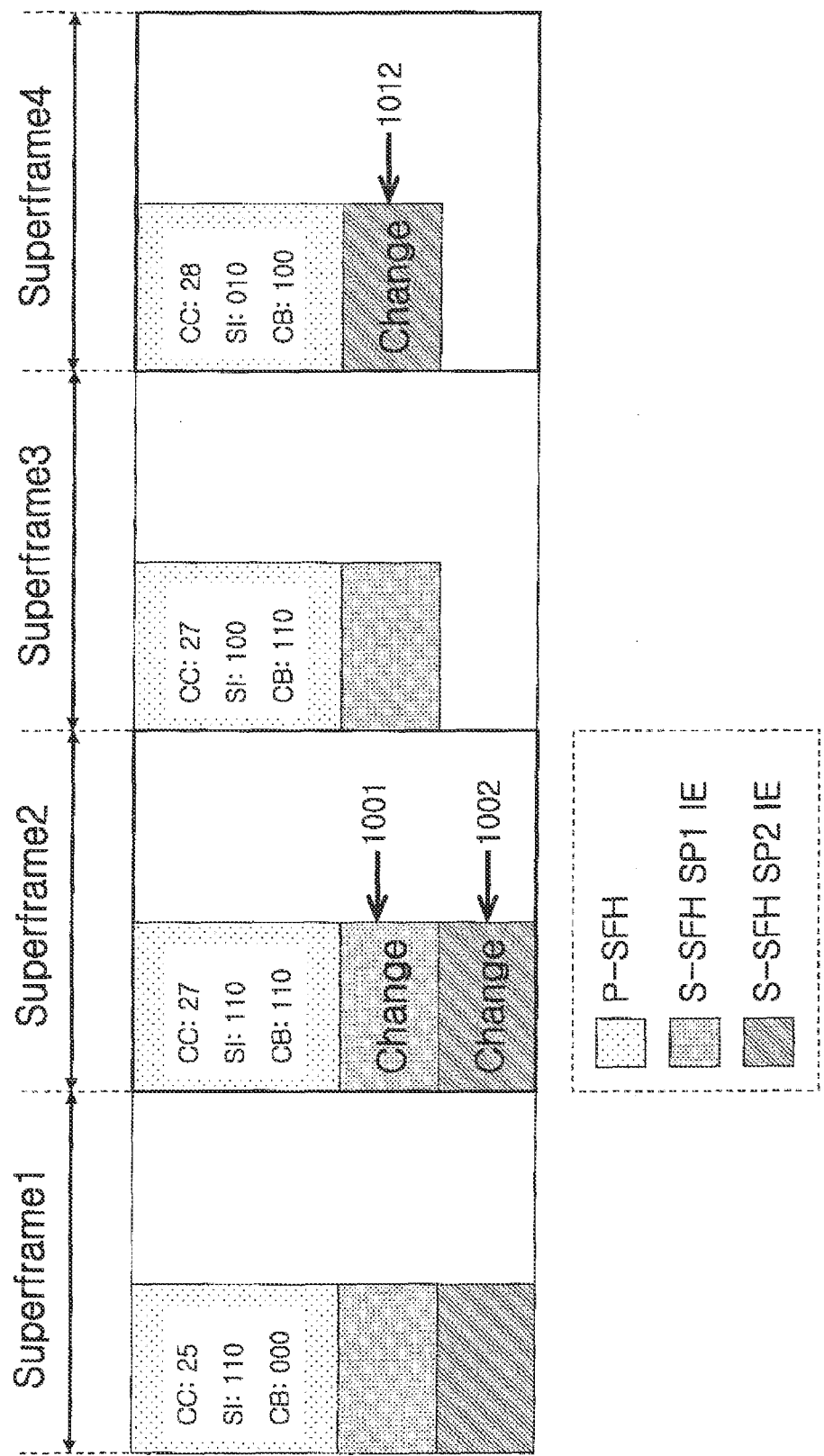
FIG. 10 is illustrates a method of changing a change count of an S-SFH and S-SFH subpacket (SP) change bitmap (CB) information transferred via a P-SCH when system information is changed according to a different exemplary embodiment of the present invention.

FIG. 10 is illustrates a method of changing a change count of an S-SFH and S-SFH subpacket (SP) change bitmap (CB) information transferred via a P-SCH when system information is changed according to another embodiment of the present invention.

In the exemplary embodiment illustrated in FIG. 10, the CC of the S-SFH and the S-SFH SP change bitmap transferred via the P-SFH is changed to S-SFH subpacket (SP) unit by the base station.

As described above, the CC is a change count indicating whether or not essential system information transferred via the S-SFH has been changed, SI, a scheduling information bitmap of the S-SFH SPs, indicates an S-SFH SP transferred to the terminal scheduled at the corresponding superframe, and CB indicates an S-SFH SP having changed system information at the corresponding superframe.

As illustrated, the CC, SI, and CB of the S-SFH transmitted via the P-SFH, and when it is assumed that the previously stored CC is 25 at a time point before the superframe 1 is received and S-SFH SP1 and SP2 having unchanged system information are scheduled at the superframe 1 and delivered, the stored CC is the same as the received CC 25 at the P-SFH of the superframe 1, the SI bitmap is set to be '110' so as to indicate that the SP of the scheduled S-SFH is SP1 and SP2, and CB is '000'.

The SP1 and SP2 are changed (1001, 1002) and first transmitted during the superframe 2, and the S-SFH change count is increased at the superframe 2 in which the changed S-SFH SP IE is first transmitted, so the CC is increased by 2 to 27. In this case, because the count is increased as any of the value of SP IEs (i.e., in the unit of SP) and the two SPs are changed, the count of the CC is increased by 2 to 27.

Accordingly, at the P-SFH of the superframe 2, the CC is increased to 27, the SI bitmap is set to be '110' so as to indicate that the SP of the scheduled S-SFH is SP1 and SP2, and the values of the bit positions SP1 and SP2 of the S-SFH change bitmap corresponding to the S-SFH SP IE which has been changed at the time point when the S-SFH change count was increased are toggled, so the CB is changed to '110' from '000'. Namely, when the S-SFH SP1 IE is changed, the value of the first bit of the S-SFH change bitmap is toggled, and when the S-SFH SP2 IE is changed, the value of the second bit of the S-SFH change bitmap is toggled.

In addition, like the case of the S-SFH change count, although, among the system information, the 8 bit-MSB superframe number transferred via the S-SFH SP1 and the start superframe offset transferred via each S-SFH SP are changed, the S-SFH change bitmap is not affected.

Because there is no changed at the S-SFH of the superframe 3, the base station maintains the existing CC value (CC=27) and the CB (CB=110) as it is, and transmits them to the terminal via the P-SCH.

At the superframe 4, the S-SFH SP2 is changed and transmitted, so the base station increases the CC value by one to 28 and changes the CB to 100 by toggling the value of the second bit of the S-SFH CB corresponding to the S-SFH SP2 and transmits the same to the terminal via the P-SFH.

The method of changing the S-SFH CC and CB values in changing system information has been described with reference to FIGS. 5 to 10. Hereinafter, a method of updating system information by the terminal upon receiving the system change information will now be described.

Figure 11:
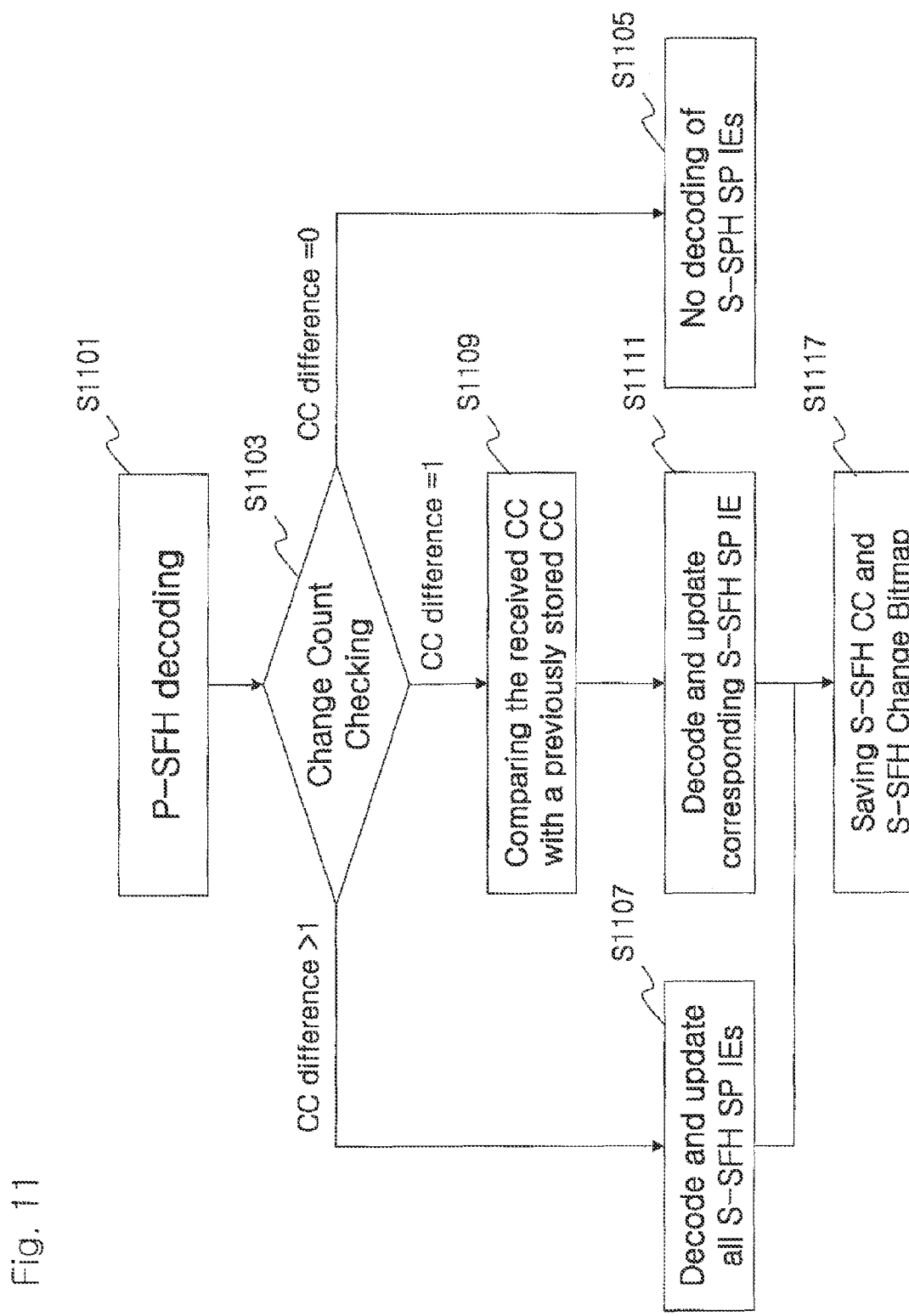
FIG. 11 sequentially shows a process of updating system information according to a first exemplary embodiment of the present invention.

FIG. 11 sequentially shows a process of updating system information according to a first exemplary embodiment of the present invention.

The base station transmits a P-SFH IE including the S-SFH scheduling information bitmap (SI), the S-SFH change count (CC), and the S-SFH subpacket (SP) change bitmap (S-SFH SP CB) to the terminal.

Upon receiving the P-SFH IE from the base station, the terminal decodes the received P-SFH IE (S1101).

The terminal decodes the S-SFH change count (CC) and the S-SFH SP change bitmap (CB) information included in the P-SFH IE and determines whether to decode the S-SFH IE.

First, the terminal compares values of each S-SFH CC in the last received P-SFH IE and the last stored P-SFH IE whenever it receives P-SFH IE (S1103).

Upon comparison of the CC values, if there is no difference between the two values (CC difference=0), the terminal determines that there is no change at the S-SFH, and omits decoding of every S-SFH IE (S1105).

Upon comparison of the CC values, if the difference between the two values is greater than 1 (CC difference>1), the terminal determines that one or more S-SFH IE have been changed and performs decoding on every S-SFH IE (S1107). And after performing decoding on every S-SFH ID, the terminal stores the changed S-SFH CC value and the S-SFH SP CB value (S1117).

Upon comparison of the CC values, if the difference between the two values is 1 (CC difference=1), the terminal compares S-SFH CB which has been previously received and stored and the newly received S-SFH CB (S1109).

According to the changed bitmap comparison result, the terminal determines that the S-SFH SP IE corresponding to the toggled bit position is the changed S-SFH SP IE and decodes and updates the corresponding SP IE (S1111).

Thereafter, the terminal stores the changed S-SFH CC value and the S-SFH SP CB value (S1117).

In the exemplary embodiment illustrated in FIG. 11, when the difference between the stored S-SFH change count and the S-SFH change count of the currently received P-SFH is 2, if the same S-SFH SP is continuously changed (the value of the same bit position as the S-SFH SP change bitmap is toggled: the terminal is able to know whether or not the S-SFH has been changed but cannot know which S-SFH SP has been changed. Thus, in the case where the terminal cannot know which S-SFH SP has been changed, it receives every S-SFH SP and checks whether the difference value of the S-SFH change count is 1 or 2 or larger, and determines it.

Figure 12:
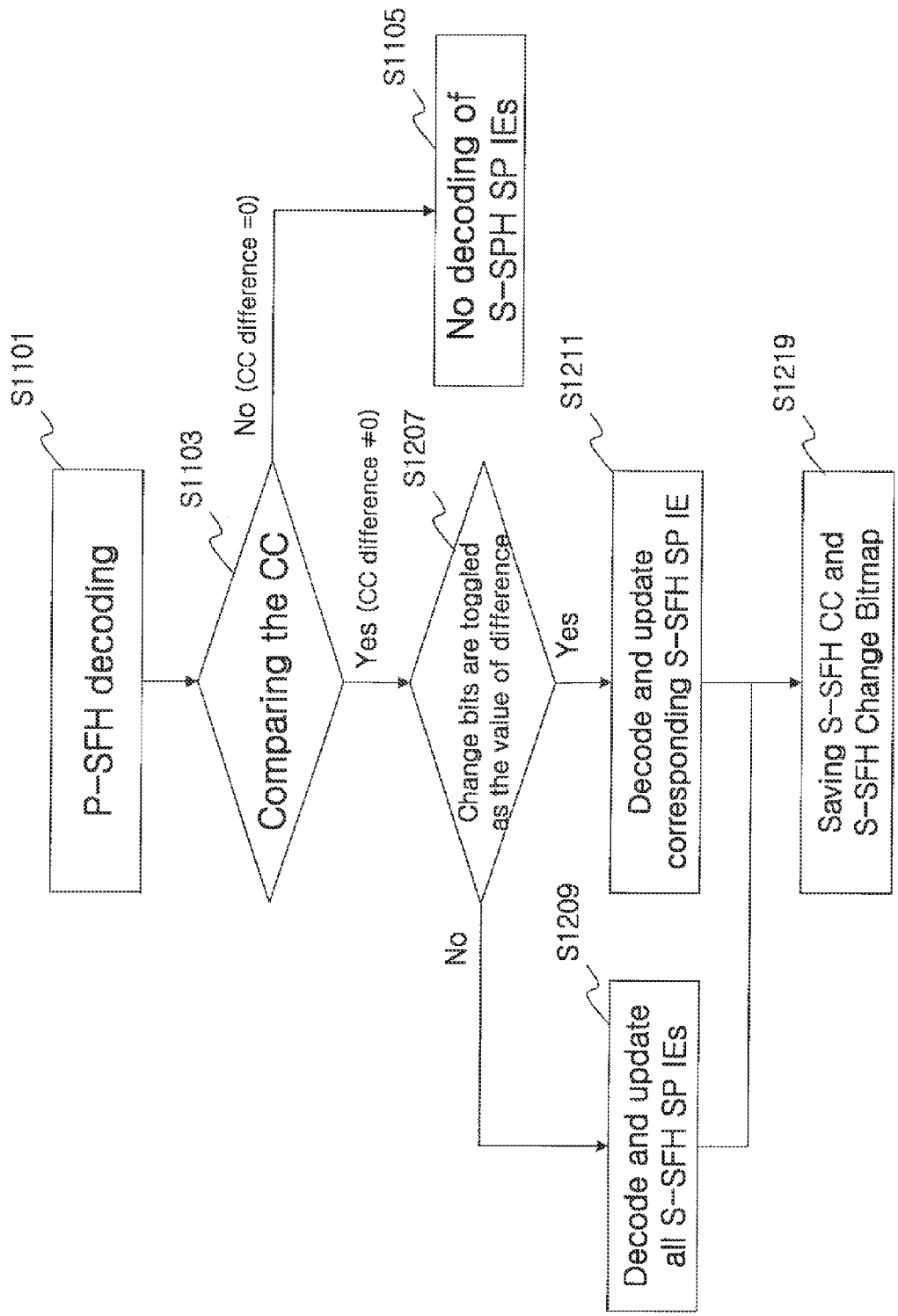
FIG. 12 sequentially shows a process of updating system information according to a second exemplary embodiment of the present invention.

FIG. 12 sequentially shows a process of updating system information according to a second exemplary embodiment of the present invention.

In the exemplary embodiment illustrated in FIG. 12, when it is determined by using the S-SFH change count and the S-SFH SP change bitmap (checking whether or not it is toggled by a difference value), the continuously changed (the value of the same bit position as the S-SFH SP change bitmap is toggled: 0→1→0) S-SFH SP bit information can be recognized.

Like the case illustrated in FIG. 11, the base station transmits the P-SFH IE including the S-SFH scheduling information bitmap (SI), the S-SFH change count (CC) and the S-SFH subpacket (SP) change bitmap (S-SFH SP CB) to the terminal. Upon receiving the P-SFH IE, the terminal decodes the received P-SFH IE (S1101).

The terminal decodes the S-SFH change count (CC) and the S-SFH SP change bitmap (CB) information included in the P-SFH IE and determines whether to decode the S-SFH IE, and compares an S-SFH CC value which has been previously received and stored and the newly received S-SFH CC value (S1203).

Upon comparison of the CC values, if there is no difference between the two values (CC difference=0), the terminal determines that there is no change in the S-SFH, and omits decoding of every S-SFH IE (S1105).

Upon comparison of the CC values, if there is a difference between the two values (CC difference≠0), the terminal compares S-SFH CB which has been previously received and stored and the newly received S-SFH CB in order to determine whether or not the number of toggled bits is the same as the difference between the received CC and the stored CC (S1207). When the number of toggled bits is the same as the difference of the CC values, the terminal determines that the S-SFH SP IE corresponding to the toggled bit position is a changed S-SFH SP IE and decodes and updates the corresponding SP IE (S1211). For example, if the difference value of S-SFH change count is 2, the stored CB is '000', and the received CB is '011', because the two bits among the bits of the S-SFH SP change bitmap have been toggled, the terminal determines that the number of toggled bits is the same as the difference of the CC values. Thereafter, the terminal decodes and updates the corresponding SP IEs. And the terminal stores the changed S-SFH CC value and the S-SFH SP CB value (S1219).

If the number of toggled bits is not the same as the difference of the CC values, the terminal decodes and updates all S-SFH SP IEs.

Figure 13:
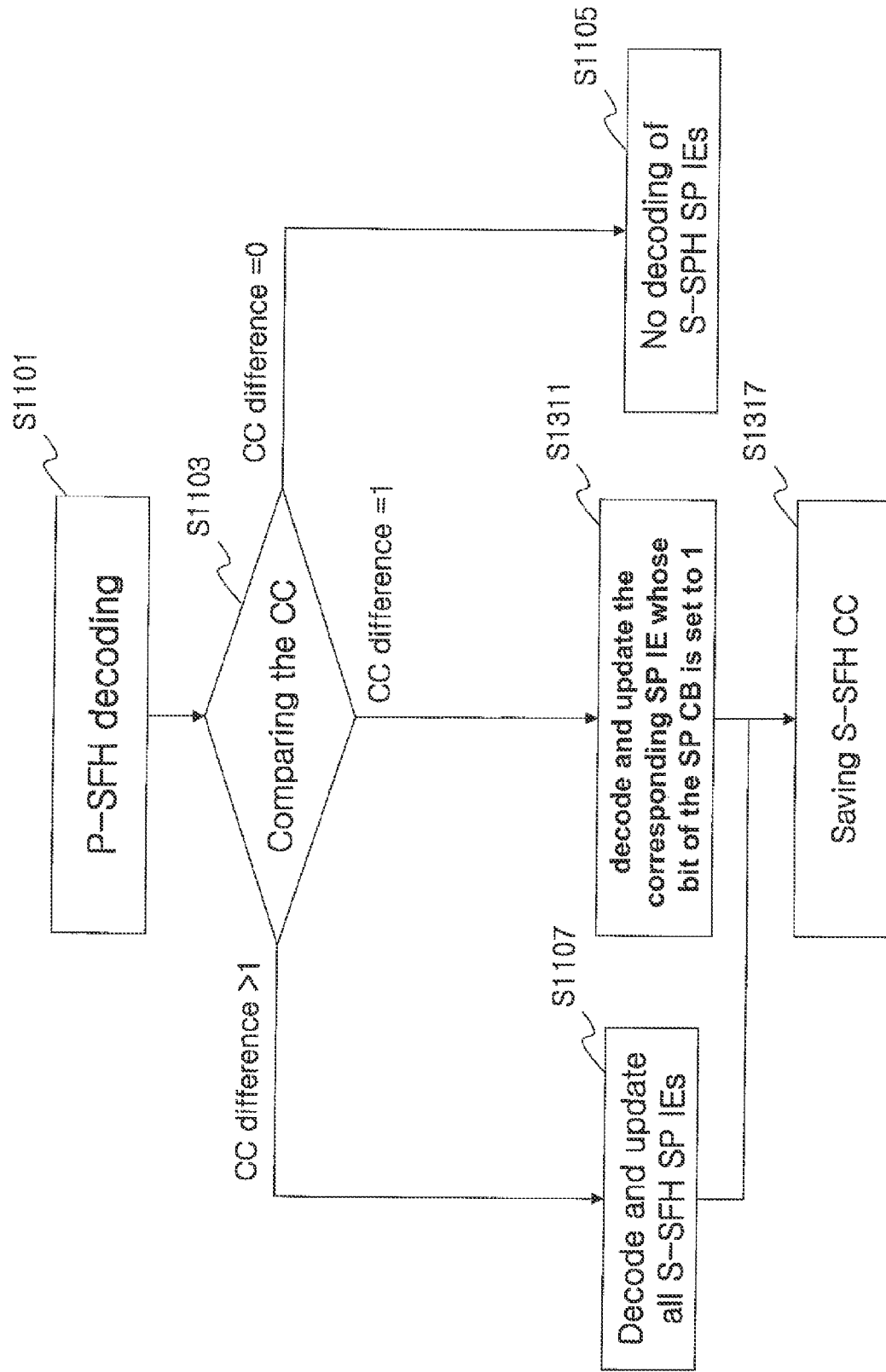
FIG. 13 sequentially shows a process of updating system information according to a third exemplary embodiment of the present invention.

FIG. 13 sequentially shows a process of updating system information according to a third exemplary embodiment of the present invention.

The base station transmits a P-SFH IE including the S-SFH scheduling information bitmap (SI), the S-SFH change count (CC), and the S-SFH subpacket (SP) change bitmap (S-SFH SP CB) to the terminal. In this case, unlike the change bitmap as described above, the base station sets only the values of the bit(s) corresponding to the changed S-SFH SP(s) as 1, and sets the other bit(s) as 0.

Upon receiving the P-SFH IE from the base station, the terminal decodes the received P-SFH IE (S1101).

The terminal decodes the S-SFH change count (CC) and the S-SFH SP change bitmap (CB) information included in the P-SFH IE and determines whether to decode the S-SFH IE.

First, the terminal compares an S-SFH CC value which has been previously received and stored and the newly received S-SFH CC value (S1103).

Upon comparison of the CC values, if there is no difference between the two values (CC difference=0), the terminal determines that there is no change in the S-SFH, and omits decoding of every S-SFH IE (S1105).

Upon comparison of the CC values, if the difference between the two values is greater than 1 (CC difference>1), the terminal determines that one or more S-SFH IE have been changed and performs decoding on every S-SFH IE (S1107). And after performing decoding on every S-SFH ID, the terminal stores the changed S-SFH CC value (S1317).

Upon comparison of the CC values, if the difference between the two values is 1 (CC difference=1), the terminal determines that the corresponding SP IE for decoding and updating is the SP IE whose bit of the SP change bitmap is set to 1. And the terminal decodes and updates the corresponding SP IE (S1311).

Thereafter, the terminal stores the changed S-SFH CC value (S1317).

Figure 14:
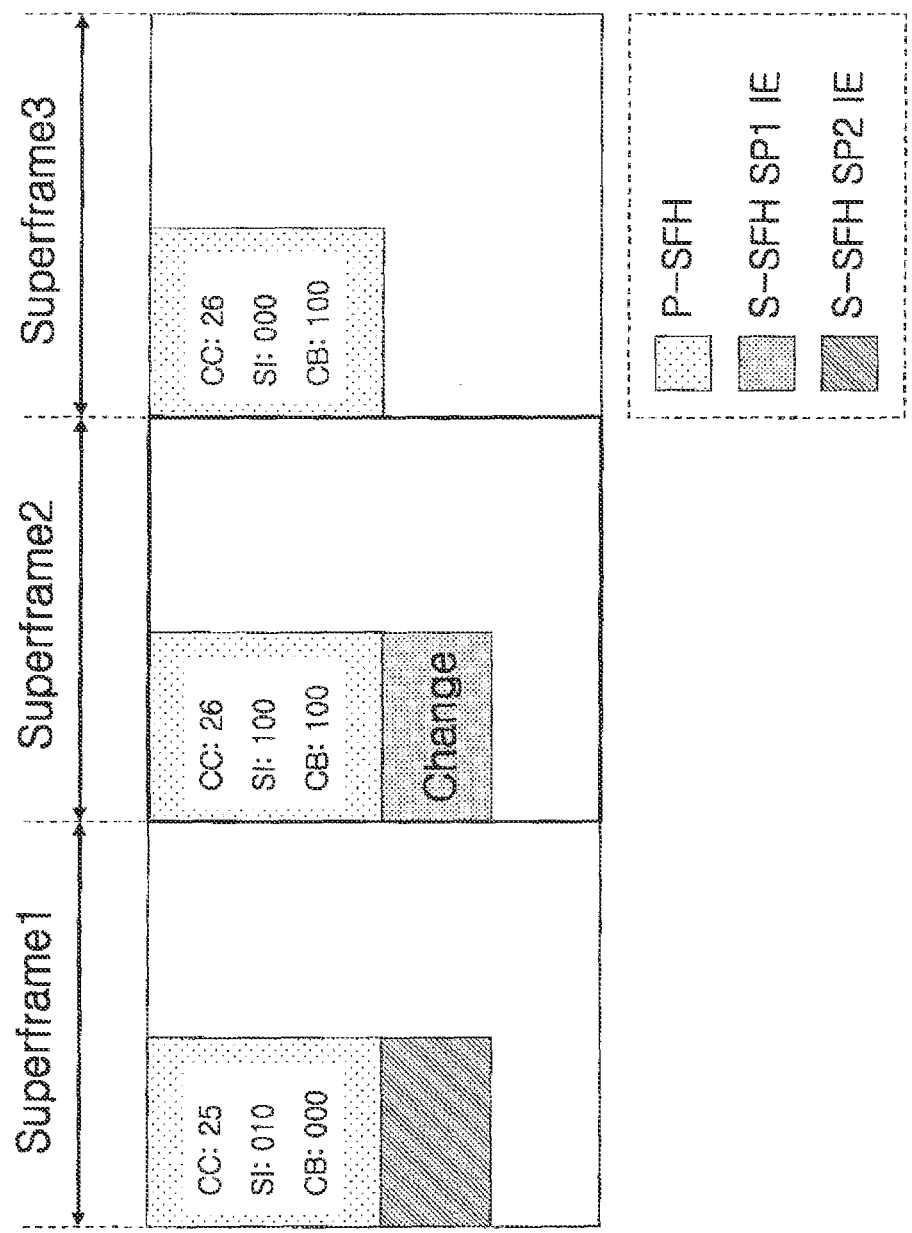
FIG. 14 illustrates a process of updating an S-SFH by a terminal according to one exemplary embodiment of the present invention.

FIG. 14 illustrates a process of updating an S-SFH by a terminal according to one exemplary embodiment of the present invention, which explains a detailed embodiment when the updating method of FIG. 12 is employed.

First, it is assumed that system information stored in the terminal is CC 25 and CB '000'.

The terminal compares the value of CC in the last received P-SFH IE and the last stored P-SFH IE whenever it receives P-SFH IE.

Upon comparison, because the CC values are the same when the terminal receives P-SFH IE at superframe 1, the terminal can recognize that the system information of its own has not been changed. Accordingly, the terminal does not decode nor update the S-SFH SP2 although the S-SFH SP2 IE is transmitted in the corresponding superframe (i.e., the superframe 1).

Upon receiving a superframe 2, the terminal compares the stored CC value with the received CC value. Because the stored CC value and the received CC value transmitted in the corresponding superframe are different, the terminal can recognize that the system information has been changed.

Then, the terminal compares the stored CB '000' and the CB '100' transmitted in the corresponding superframe to recognize a bit having a different value. Namely, because the toggled number of a changed bit is 1 and is the same as the CC difference value (CC 26–CC 25=1), the terminal can recognize that only the S-SFH SP1 corresponding to the bit position has been changed. In this case, because the terminal can recognize that the S-SFH SP1 is transmitted through the S-SFH SI information (SI='100') of the superframe 2, it decodes and updates the S-SFH SP1 in the corresponding superframe.

Thereafter, the terminal stores the S-SFH change count (26) and the S-SFH SP change bitmap (100).

Figure 15:
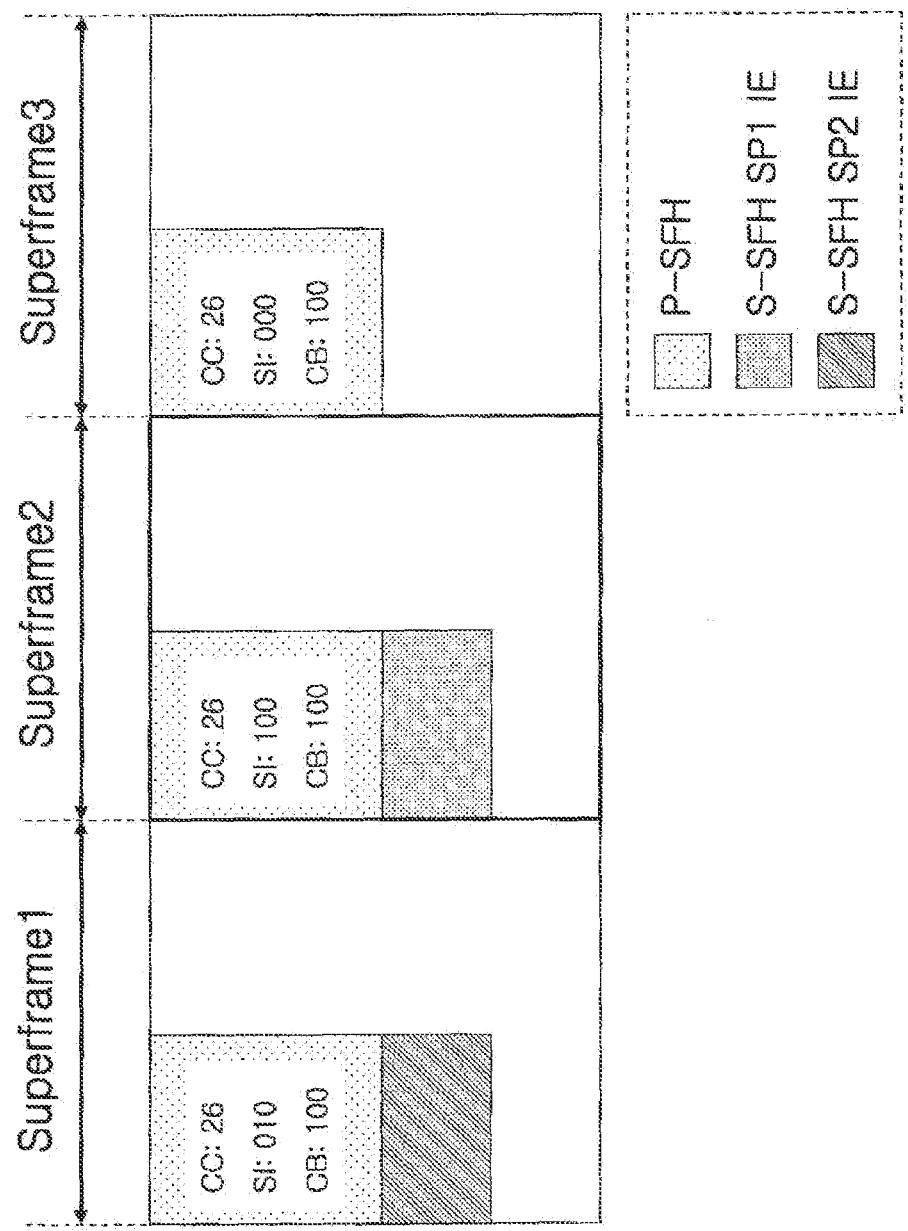
FIG. 15 illustrates a process of updating an S-SFH by a terminal according to another exemplary embodiment of the present invention.

FIG. 15 illustrates a process of updating an S-SFH IE by a terminal according to another exemplary embodiment of the present invention, which explains a detailed embodiment when the updating method of FIG. 12 is employed.

In the present exemplary embodiment, it is assumed that the terminal fails to receive the changed S-SFH SP, because the terminal is in a sleep or idle state during the first transmission of changed S-SFH SP from the base station.

If it is assumed that the CC and CB value of the last stored in the terminal is 25 and '000'. The CC value is different compared with the CC value (26) transmitted in the superframe 1 (the difference is 1), so the terminal recognizes that the system information has been changed.

In this case, the terminal compares the last stored CB '000' and the CB '100' transmitted in the corresponding superframe.

Because the number of bit positions having a different value is the same as the CC difference value (CC 26–CC 25=1), the terminal can recognize that only the S-SFH SP 1 corresponding to the bit position has been changed.

However, because the SI of the superframe 1 is '010' and the CB is '100', the terminal recognizes that the transmitted S-SFH SP2 in the superframe 1 has not been changed, so the terminal does not decode the S-SFH SP2 received via the superframe 1.

In the superframe 2, the S-SFH SP 1 is transmitted (SI='100'), so the terminal decodes and updates the S-SFH SP1 in the corresponding superframe.

Thereafter, the terminal stores the S-SFH change count (26) and the S-SFH SP change bitmap (100).

Figure 16:
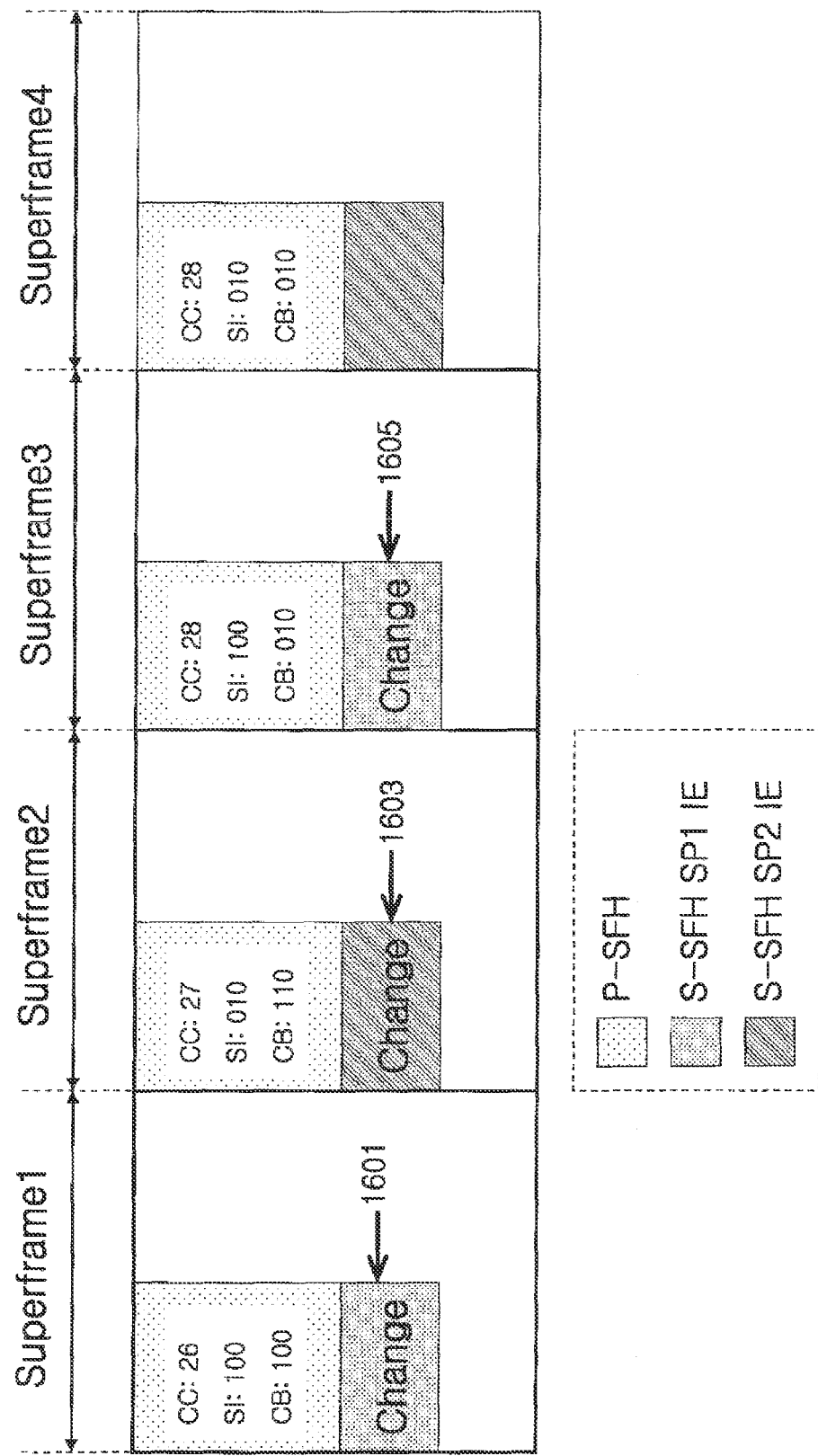
FIG. 16 illustrates a process of updating an S-SFH by a terminal according to still another exemplary embodiment of the present invention.

FIG. 16 illustrates a process of updating an S-SFH by a terminal according to still another exemplary embodiment of the present invention, which explains a detailed embodiment when the updating method of FIG. 12 is employed.

Specifically, FIG. 16 illustrates the process of updating system information in case where the terminal in a sleep or idle state enters an unavailable interval so it cannot check P-SFH every superframe.

When the CC and CB of the last stored in the terminal is CC 25 and CB '000' and if first and second superframes are included in the unavailable interval of the terminal, all of the operation of the terminal including P-SFH decoding or the like in the corresponding superframes (i.e., first and second superframes) is interrupted and the terminal enters a power saving mode to minimize power consumption. Thus, the terminal cannot receive changed S-SFH SP1 (1601) and S-SFH SP2 (1603) during the first and second superframes.

When a third superframe is a listening interval of the terminal, the terminal decodes a P-SFH transmitted in the corresponding superframe and compares the stored CC value and the CC value transmitted in the corresponding superframe. Upon comparison, because the values are different (CC difference is 3), the terminal can recognize that the system information has been changed.

Thus, the terminal compares the stored CB '000' and the CB '010' transmitted in the corresponding superframe. According to the result of the comparison of CBs, because the number (1) of the bit position having a different value is different from the CC difference value (CC 28–CC 25=3), the terminal decodes and updates all the S-SFH SPs.

In this case, the terminal may update the system information by using the scheduling periodicities information of each S-SFH SP along with the values of the CC and the CB.

The period information of the S-SFH SP including the scheduling periodicities information may be transferred to the terminal (1) through a particular S-SFH SP in which scheduling periodicities information of different S-SFH SPs is transferred (namely, it includes period information of itself), (2) through a MAC management message (e.g., RNG-REQ/RSP, SBC-REQ/RSP, REG-REQ/RSP) transferred in a network entry procedure, or (3) by defining a fixed period in advance.

The terminal can recognize a transmission period of each S-SFH SP explicitly through one of the foregoing three methods. Also the terminal can know of the transmission period of each S-SFH SP implicitly upon receiving each S-SFH SP at least two times or more. The terminal determines that the information is valid until when the recognized transmission period information of each S-SFH SP is changed.

Figure 17:
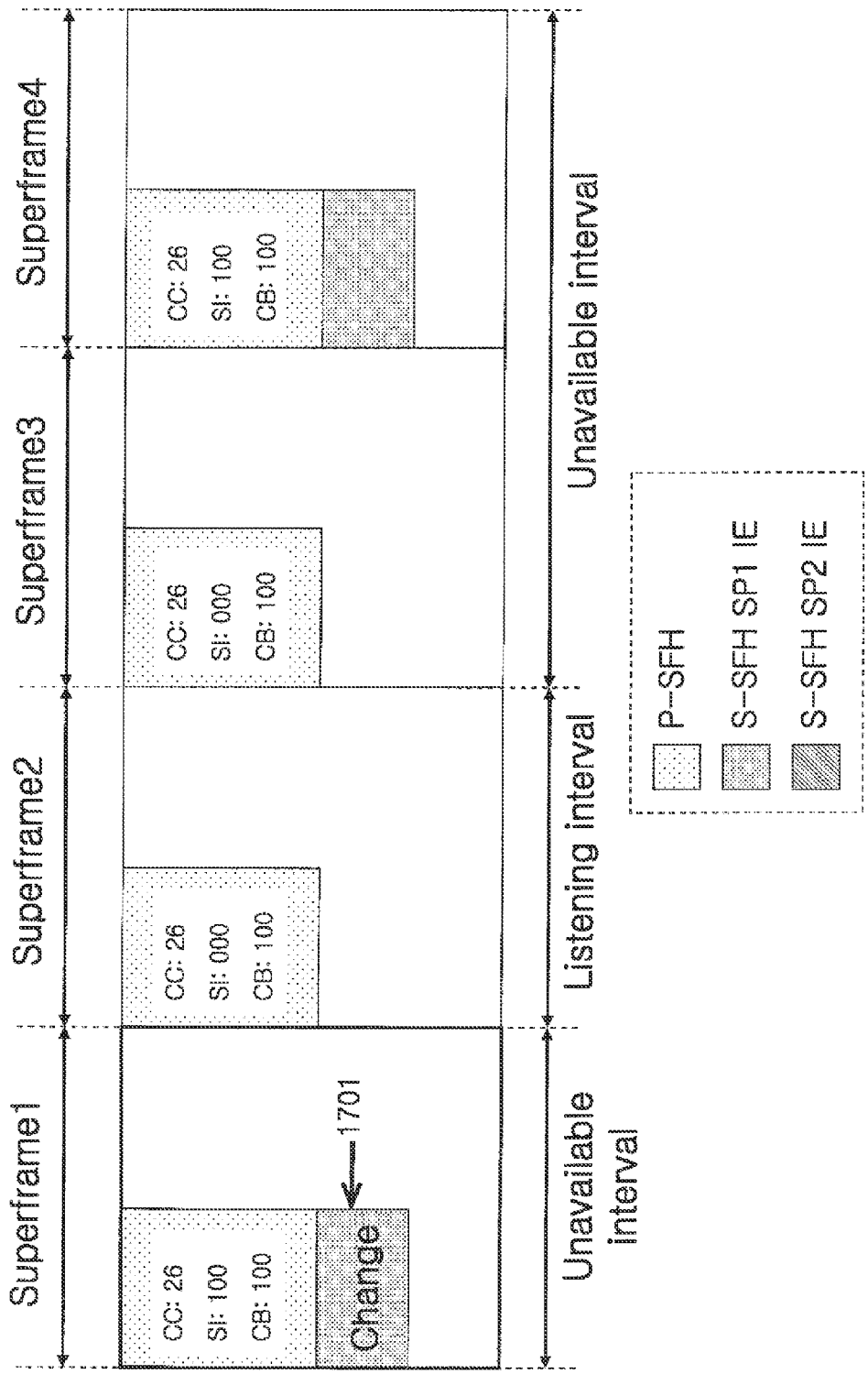
FIG. 17 illustrates a process of updating an S-SFH by a terminal in a sleep mode/idle mode according to one exemplary embodiment of the present invention.

FIG. 17 illustrates a process of updating an S-SFH by a terminal in a sleep/idle mode according to one exemplary embodiment of the present invention.

As illustrated, because the terminal is in an unavailable interval during the superframe 1 in which the changed S-SFH SP is transmitted, it cannot receive the changed S-SFH SP (1701) at the superframe 1. During the superframe 2, the terminal is in a listening interval And the terminal enters the unavailable interval at the superframe 3 and the superframe 4.

Thus, when the terminal in the sleep or idle state fails to receive all the changed S-SFH SP(s) during the listening interval, the corresponding terminal should wake up at a superframe next time when the corresponding S-SFH SP(s) are transmitted during the unavailable interval (power saving/sleep interval) by using the transmission period information of the changed S-SFH SP(s). Preferably, the corresponding terminal should wake up at a first superframe next time when the corresponding S-SFH SP(s) are transmitted. Namely, the terminal does not need to wake up at a superframe during which only the S-SFH SP(s) which do not need to be updated are transmitted by using the transmission period information of the changed S-SFH SP(s). After updating the S-SFH SP(s), the terminal may perform a different operation such as turning off power of one or more physical devices or not requiring communication with the base station during the remaining unavailable interval.

If it is assumed that the value of CC and CB in the last stored are 25 and '000' and the unavailable interval and the listening interval are determined as illustrated in FIG. 17, the terminal can wake up at the superframe 2 to decode the P-SFH and recognize that the S-SFH SP 1 has been changed through the CC and CB in the corresponding superframe 2. However, the changed S-SFH SP1 is not transmitted during the superframe 2, the corresponding listening interval. Thus, if the fact that the changed S-SFH SP1 is transmitted during the superframe 4 according to the transmission period information of the S-SFH SP1 is recognized, although the superframe 4 is included in the unavailable interval, the terminal wakes up at the corresponding superframe 4 and decodes and updates the corresponding S-SFH SP1.

If corresponding S-SFH SP(s) have not been received during the superframe, during which the corresponding S-SFH SP(s) were predicted to be transmitted within the unavailable interval by using the transmission period information of the changed S-SFH SP(s), then the terminal should maintain in an awake state until when it receives all the corresponding S-SFH SP(s), so the terminal should not be changed to a power saving state. If the terminal first receives the transmission period information of the S-SFH SPs before receiving the changed S-SFH SP(s), the terminal may use the corresponding transmission period in order to update the changed S-SFH SP(s).

Figure 18:
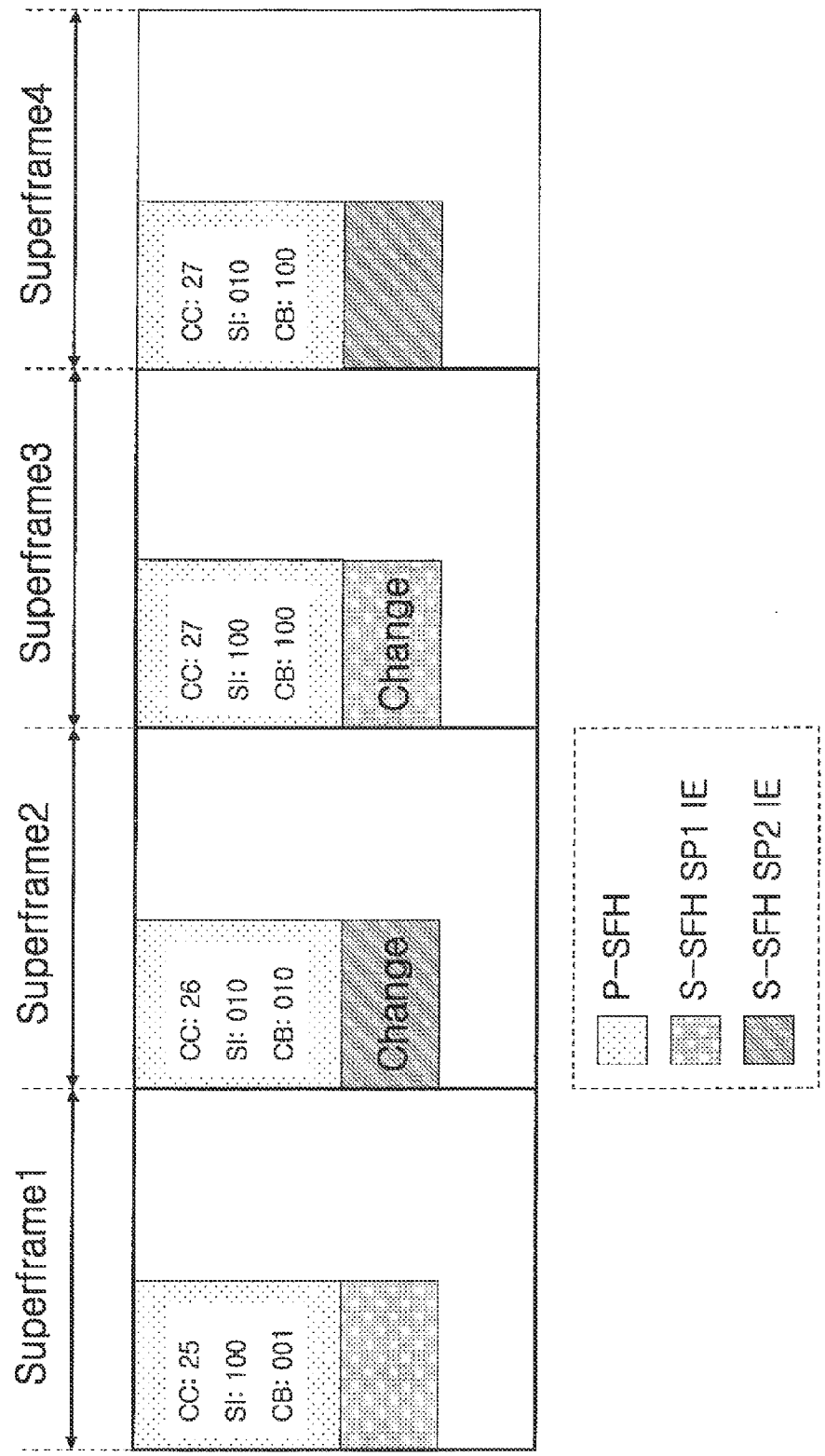
FIG. 18 illustrates a process of updating an S-SFH by a terminal in a sleep mode/idle mode according to another exemplary embodiment of the present invention.

FIG. 18 illustrates a process of updating an S-SFH by a terminal in a sleep/idle mode according to another exemplary embodiment of the present invention, which explains a detailed embodiment when the updating method of FIG. 13 is employed.

It is assumed that system information stored in the terminal is CC 25.

The terminal compares the stored CC value and a received CC value during a superframe 1.

Upon comparison, because the CC values are equal, the terminal can recognize that its system information has not been changed. Thus, the terminal does not decode nor update the S-SFH SP1 transmitted during the corresponding superframe (i.e., the superframe 1).

Upon receiving a superframe 2, the terminal compares the stored CC value and a received CC value. According to the comparison result, because the stored CC value and the CC value transmitted during the corresponding superframe are different, the terminal can recognize that the system information has been changed.

In this case, the terminal may recognize that only the S-SFH SP2 corresponding to the bit position having a value '1' has been changed. In this case, because the terminal can recognize that the S-SFH SP2 is transmitted through the S-SFH SI information (SI='010') of the superframe 2, the terminal decodes and updates the S-SFH SP2 during the corresponding superframe and stores the S-SFH change count (26).

Thereafter, the terminal receives a superframe 3, compares the stored CC value and a received CC value. Because the stored CC value and the CC value transmitted during the corresponding superframe are different, the terminal can recognize that the system information has been changed.

In this case, the terminal can recognize that only the S-SFH SP1 corresponding to a bit position having a value '1' has been changed. In this case, the terminal can recognize that the S-SFH SP1 is transmitted via the S-SFH SI information (SI='100') of the superframe 3, the terminal decodes and updates the S-SFH SP1 during the corresponding superframe. Thereafter, the terminal stores the S-SFH change count (27).

Figure 19:
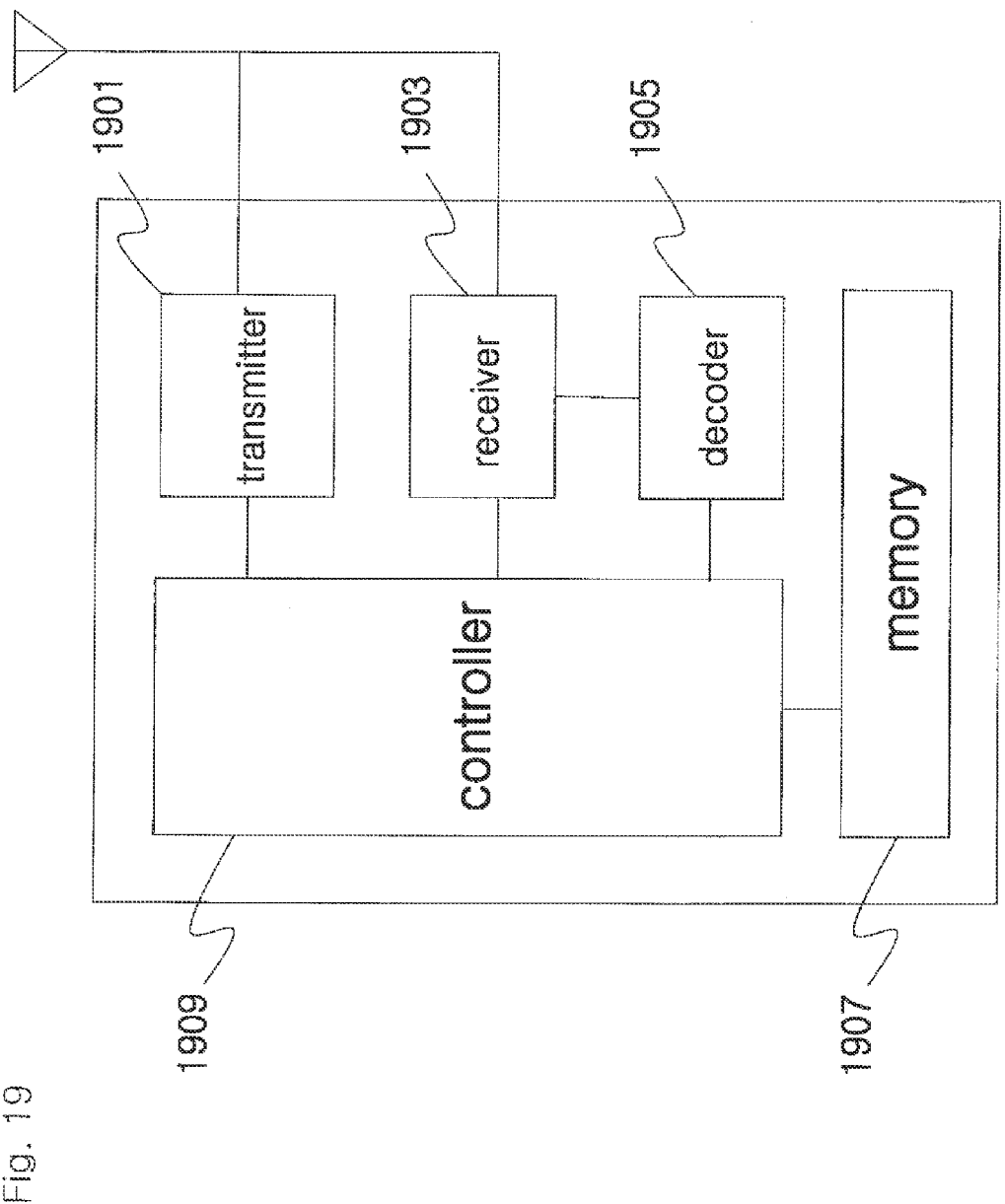
FIG. 19 shows a schematic block diagram of a terminal performing the operation of updating system information according to an exemplary embodiment of the present invention.

FIG. 19 is a schematic block diagram of a terminal performing the operation of updating system information according to an exemplary embodiment of the present invention.

The terminal performing the operation of updating system information includes a transmitter 1901, a receiver 1903, a decoder 1905, a memory 1907, and a controller 1909.

The receiver 1903 receives data by means of a superframe including a P-SFH from the base station.

The decoder 1905 decodes a P-SFH information element (IE) including a scheduling information bitmap, a change count, and a subpacket (SP) change bitmap of the S-SFH in the received superframe.

The memory 1907 stores the change count and the subpacket change bitmap of the S-SFH.

The controller 1909 controls the operation of decoding and updating the information elements of S-SFH SP by comparing the change count and the change bitmap stored in the memory 1907 and the received change count and the change bitmap. Also, the controller 1909 compares the change count stored in the memory 1907 and the received change count, and if there is no difference between the two values, the controller 1909 does not decode the S-SFH information element, while if there is a difference between the two values, the controller 1909 compares the SP change bitmap stored in the memory 1907 and the received SP change bitmap.

As described above, upon comparing the SP change bitmap stored in the memory and the received SP change bitmap, if the number of toggled bits is equal to the difference between the change count values, the controller 1909 decodes S-SFH SPs corresponding to the positions of the toggled bits in the received superframe, and if the number of toggled bits is different from the difference between the change counts, the controller 1909 decodes every S-SFH SP of the superframe. Or, when only the value of the bits corresponding to the changed S-SFH SP(s) is set to be 1 while the other remaining bits are set to be '0', the controller 1909 decodes S-SFH SPs having a bit value '1' in the received superframe.

Figure 20:
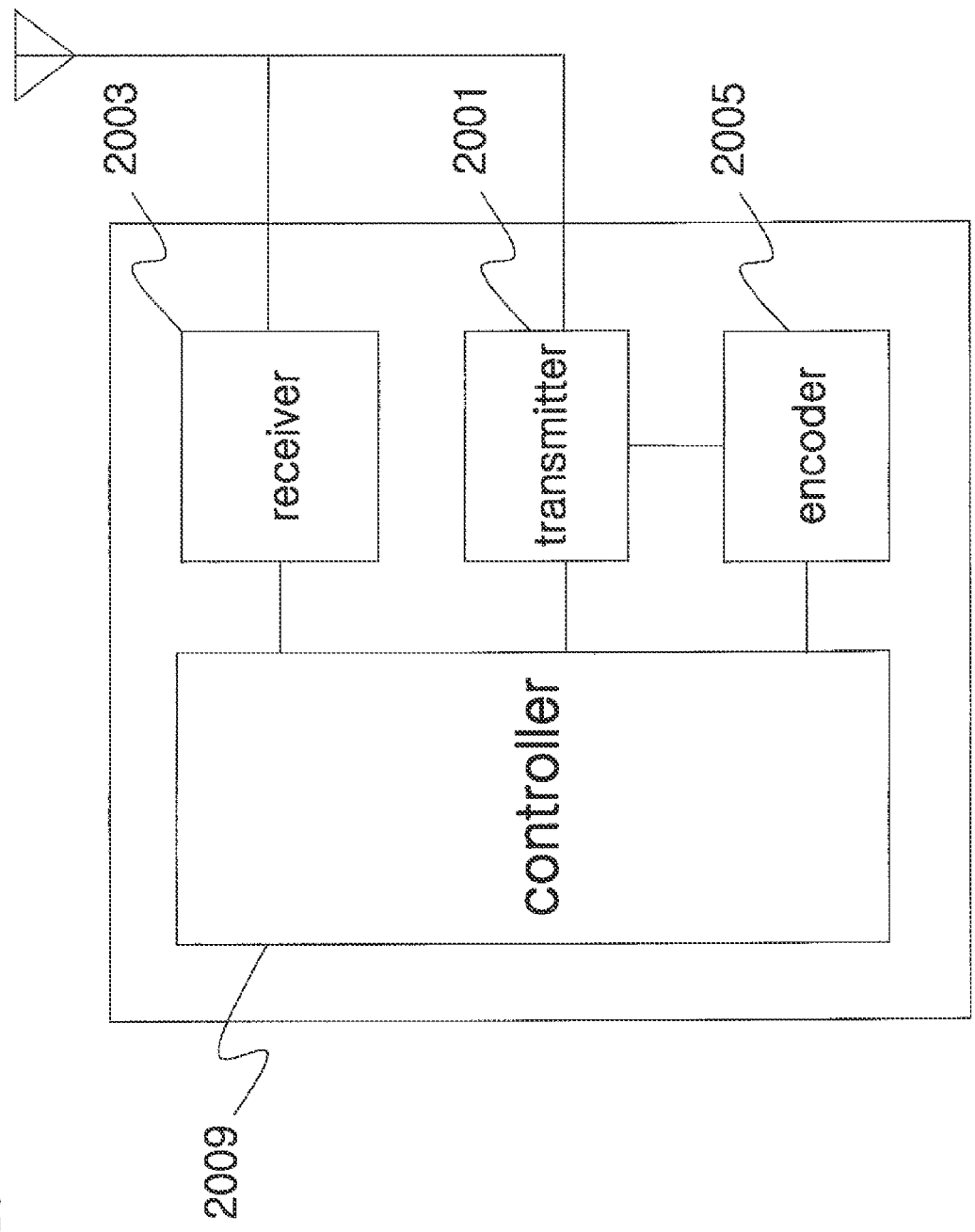
FIG. 20 shows a schematic block diagram of a base station performing the operation of updating system information according to an exemplary embodiment of the present invention

FIG. 20 is a schematic block diagram of a base station performing the operation of updating system information according to an exemplary embodiment of the present invention.

The base station performing the operation of updating system information includes a transmitter 2001, a receiver 20003, an encoder 2005, and a controller 2009.

The encoder 2005 encodes a P-SFH information element (IE) including a scheduling information bitmap, a change count, and a subpacket (SP) change bitmap of an S-SFH.

When the S-SFH SP information element is changed, the controller 2009 changes the change count of the S-SFH by 1 whenever the S-SFH SP is changed, changes the SP change bitmap of the S-SFH such that a bit of a particular position corresponding to a change in the particular SP is toggled, or sets only the bit values corresponding to the changed S-SFH SP(s) as '1' and the other remaining bits as '0'.

The transmitter 201 transmits the superframe including the P-SFH information element including the change count and the SP change bitmap of the changed S-SFH and the changed S-SFH SP.

As described above, besides the above-described elements, the device according to the present invention basically includes software and hardware, for example, an output unit (display, speaker, etc.), an input unit (keypad, microphone, etc.), a memory, a transmission and reception unit (RF module, antenna, etc.), and the like, required for implementing the technical idea of the present invention. These elements are obvious to the skilled person in the art, so its detailed description will be omitted.

In an exemplary embodiment of the present invention, the above-described method can be implemented by software, hardware or their combination. For example, the method according to the present invention can be stored in a storage medium (for example, an internal memory of a mobile terminal, a flash memory, a hard disk, etc.) and implemented by codes or commands in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for transmitting updated system information through a superframe header (SFH) by a base station in a broadband wireless communication system, the method comprising:

transmitting the SFH to a mobile terminal, wherein the SFH includes a primary superframe header information element (P-SFH IE) in every superframe and at least one secondary superframe header subpacket information element (S-SFH SP IE) in a scheduled superframe, wherein each P-SFH IE includes a scheduling information bitmap indicating the at least one S-SFH SP IE, a change count (CC) of an S-SFH, and an SP change bitmap indicating a changing status of the at least one S-SFH SP IE, and wherein the CC is not increased until one of the at least one S-SFH SP IE is changed; and transmitting a P-SFH IE including an increased CC in a specific superframe to the mobile terminal, wherein a difference between a previous CC and the increased CC is used to indicate whether to update one of the at least one S-SFH SP IE.

2. The method of claim 1, wherein:

the S-SFH comprises three SP IEs and the SP change bitmap comprises three bits indicating a changing status of each of the three SP IEs; and when any value of the SP IEs is changed, a bit at a corresponding position in the SP change bitmap is toggled or set to 1.

3. The method of claim 2, wherein the three SP IEs are a S-SFH SP 1 IE, a S-SFH SP 2 IE and a S-SFH SP 3 IE.

4. The method of claim 3, wherein the three SP IEs each have a different transmission period, and scheduling periodicity information of the three SP IEs is transmitted via the S-SFH SP 3 IE.

5. The method of claim 1, wherein the CC is incremented by 1 modulo 16 whenever any value of the at least one S-SFH SP IE is changed.

6. The method of claim 1, wherein when there is no difference between the transmitted CC and a previously stored last CC, the method further comprises transmitting an indication to the mobile terminal indicating that decoding and updating for the at least one S-SFH SP IE are not required.

7. The method of claim 1, wherein when the difference between the transmitted CC and a previously stored last CC is one, the method further comprises permitting the mobile terminal to decode and update the one S-SFH SP IE of the at least one S-SFH SP IE whose bit in the SP change bitmap is set to 1.

8. A base station for transmitting updated system information through a superframe header (SFH) in a broadband wireless communication system, the base station comprising:

a transceiver configured to transmit the SFH to a mobile terminal, wherein the SFH includes a primary superframe header information element (P-SFH IE) in every superframe and at least one secondary superframe header subpacket information element (S-SFH SP IE) in a scheduled superframe, wherein each P-SFH IE includes a scheduling information bitmap indicating the at least one S-SFH SP IE, a change count (CC) of an S-SFH, and an SP change bitmap indicating changing status of the at least one S-SFH SP IE, wherein the CC is not increased until one of the at least one S-SFH SP IE is changed, wherein the transceiver is further configured to transmit the P-SFH IE including an increased CC in a specific superframe, and wherein a difference between a previous CC and an increased last CC is used to indicate whether to update one of the at least one S-SFH SP IE.

9. The base station of claim 8, wherein the transmitter is further configured to transmit an indication to the mobile terminal indicating that decoding and updating for the at least one S-SFH SP IE are not required when there is no difference between the transmitted CC and a previously stored last CC.

10. The base station of claim 8, wherein the transmitter is further configured to transmit an indication to the mobile terminal permitting the mobile terminal to decode and update the a one of the at least one S-SFH SP IE whose bit in the SP change bitmap is set to 1 when the difference between the transmitted CC and a previously stored last CC is one.

11. A method of a mobile terminal for updating system information transmitted through a superframe header (SFH) in a broadband wireless communication system, the method comprising:

receiving the SFH, from a base station, wherein the SFH includes a primary superframe header information element (P-SFH IE) in every superframe and at least one secondary superframe header subpacket information element (S-SFH SP IE) in a scheduled superframe, wherein each P-SFH IE includes a scheduling information bitmap indicating the at least one S-SFH SP IE, a change count (CC) of an S-SFH, and an SP change bitmap indicating a changing status of the at least one S-SFH SP IE, and wherein the CC is not increased until one of the at least one S-SFH SP IE is changed; and receiving, from the base station, the P-SFH IE including an increased CC in a specific superframe; and decoding and updating one of the at least one S-SFH SP IE when a difference between the CC and a previously stored last CC is greater than one.

12. The method of claim 11, wherein when there is no difference between the CC and the previously stored last CC, decoding and updating for the at least one S-SFH SP IE is not performed.

13. The method of claim 11, wherein when the difference between the CC and the previously stored last CC is one, decoding and updating of the one of the at least one S-SFH SP IE whose bit in the SP change bitmap is set to 1 is performed.

* * * * *